US012792705B2

(12) United States Patent
Duong et al.

(10) Patent No.: US 12,792,705 B2
(45) Date of Patent: Nov. 10, 2026

(54) COMPUTING SYSTEMS FOR KEYING AND REKEYING CRYPTOGRAPHIC CREDENTIALS FOR ACCESSING A DATA CHAIN USING STRONG AUTHENTICATION

(71) Applicant: LOGIN ID INC., San Mateo, CA (US)

(72) Inventors: Peter Thien Duong, Mississauga (CA); Behrooz Sabet, Toronto (CA)

( * ) Notice: Subject to any disclaimer, the term of this patent is extended or adjusted under 35 U.S.C. 154(b) by 0 days.

(21) Appl. No.: 19/191,669

(22) Filed: Apr. 28, 2025

(65) Prior Publication Data

US 2025/0272371 A1 Aug. 28, 2025

Related U.S. Application Data

(63) Continuation of application No. 18/107,607, filed on Feb. 9, 2023, now Pat. No. 12,314,358.

(60) Provisional application No. 63/308,565, filed on Feb. 10, 2022.

(51) Int. Cl.

| | |
|---|---|
| ***G06F 21/31*** | (2013.01) |
| ***G06F 21/44*** | (2013.01) |
| ***H04L 9/00*** | (2022.01) |
| ***H04L 9/30*** | (2006.01) |

(52) U.S. Cl.

CPC .............. *G06F 21/31* (2013.01); *G06F 21/44* (2013.01); *H04L 9/30* (2013.01); *H04L 9/50* (2022.05)

(58) Field of Classification Search

CPC ...................................................... G06F 21/31

See application file for complete search history.

(56) References Cited

U.S. PATENT DOCUMENTS

| | | | | |
|---|---|---|---|---|
| 2018/0167383 | A1* | 6/2018 | Mandyam ............... | H04L 63/08 |
| 2019/0075102 | A1* | 3/2019 | Kim ...................... | H04L 9/3247 |
| 2020/0336308 | A1* | 10/2020 | Deutschmann ......... | H04L 9/088 |
| 2021/0058256 | A1* | 2/2021 | Nishimura ............ | G06F 21/335 |

* cited by examiner

*Primary Examiner* — Bradley W Holder

(57) ABSTRACT

User accounts for blockchain technology are prone to security risks, such as account take-overs by malicious actors and lost or inaccessible wallets. A data access server system is herein provided to enable strong authentication credentials, such as FIDO2 public and private key pairs that adhere to Fast Identity Online (FIDO) protocols, to be used generate user account. The FIDO2 public key, also herein called a device authenticator public key, is embedded in a code script, and the code script is executed by the data access server system to verify the user using FIDO authentication. The data access server system also provides user tools to create credentials and associate one or more credentials with a blockchain user account. The user tools also enable rekeying of a blockchain user account with different credentials from another blockchain user account, with both accounts belonging to the same user.

20 Claims, 21 Drawing Sheets

COMPUTING SYSTEMS FOR KEYING AND REKEYING CRYPTOGRAPHIC CREDENTIALS FOR ACCESSING A DATA CHAIN USING STRONG AUTHENTICATION

CROSS-REFERENCE TO RELATED APPLICATION

This patent application is a Continuation of U.S. patent application Ser. No. 18/107,607, filed on Feb. 9, 2023 and titled "COMPUTING SYSTEMS FOR KEYING AND REKEYING CRYPTOGRAPHIC CREDENTIALS FOR ACCESSING A DATA CHAIN USING STRONG AUTHENTICATION", which claims priority to U.S. Patent Application No. 63/308,565, filed Feb. 10, 2022 and titled "COMPUTING SYSTEMS FOR KEYING AND REKEYING CRYPTOGRAPHIC CREDENTIALS FOR ACCESSING A DATA CHAIN USING STRONG AUTHENTICATION", the entire contents of which are herein incorporated by reference.

TECHNICAL FIELD

The following generally relates to computing system for keying and rekeying access to a data chain, such as a blockchain, using strong authentication.

DESCRIPTION OF THE RELATED ART

A data chain of digital records, also called blocks, includes blocks that are cryptographically linked together. More commonly called a blockchain, each block includes a cryptographic hash of the previous block, a timestamp of when the block was published, and computational action data (also called a transaction). Blockchains are stored and computed by a distributed network of computer nodes, also herein called a blockchain network. A shared ledger (also called a distributed ledger) is represented as a blockchain, which is an append-only distributed system of records shared across a computer network. Using acceptance or consensus computations amongst the computer nodes, a computational action is validated and then a new block is appended to the blockchain.

Blockchains can be applied in different ways. For example, using the distributed ledger stored on the blockchain, one or more conditions can be added to govern a given computational action, which are used to form a smart contract. The smart contract, which is a computer program that includes data conditions for executing a computational action, is stored and computed on a blockchain network.

An example of an existing blockchain computing system is shown in FIG. 1. A blockchain network 4 includes computer nodes 4 in data communication with each other, for example, in a peer-to-peer data configuration. The computer nodes 4 can include one or more of: server computers, virtual machines hosted on a cloud computing platform, desktop computers, and other types of computers with a data communication module to connect to a data network. It will be appreciated that each computer node comprises a processor, and memory. One or more blockchain compute distributed applications 6 (herein called DApps) access the blockchain network to execute computations for a distributed software application. Data storage is distributed across the computer nodes in the blockchain network 2, and the collective data storage on the blockchain network is called blockchain storage 8. One or more blockchains 10 are stored on blockchain storage 8. A blockchain 10 includes a series of blocks (e.g., block N−3, block N−2, block N−1, block N, where N is a natural number). Each block includes a cryptographic has of a previous block, a time stamp, and data about one or more computational actions.

In an example embodiment, User 1 and User 2 with their respective computers 12 and 14 connect to a data chain access server system 17 to authenticate a desired computational action on the blockchain network 2, which is written to the blockchain 10.

The data chain access server system 17, for example, is a system of one or more server machines that includes a database 20 of user accounts and an authentication module 22. The authentication module 22 authenticates users and grants them access to execute computational actions using the blockchain network 2. For example, the data chain access server system 18 stores thereon a private key 24*a* and a corresponding public key 24*b* for User 1's account. This online storage is sometimes called an "online wallet" or an "online cryptographic wallet", which is hosted by the data chain access server system 17. A firewall, amongst other types of data security measures, are used to protect the cryptographic wallet for User 1. For User 2, for an alternative approach to security, User 2's private key 26*a* is stored on a universal serial bus (USB) key 16 and the corresponding public key 26*b* is stored on the data chain access server system 18 in relation to User 2's account. The USB key 16, or some other non-volatile memory device, is also referred to as a "cold wallet" or a "cold cryptographic wallet".

User 1, via their computer 12, provides an identity (e.g., name or email, or both) and a password to authenticate themselves with their User Account 1 and to access the same (block 50). In other words, User 1 can access their cryptographic wallet stored on the data chain access server system 18. Using their private key 24*a* and public key 24*b*, User 1 can authenticate themselves and initiate executing a computational action (block 54) on the blockchain, such as signing a smart contract 56 or executing a transaction.

User 2 inserts the USB key 16 into their computer 14 and authenticates themselves with the data chain access server system 18 using their private key 26*a*. After authentication, User 2, via their computer 14, can access their User Account 2 (block 52). For example, using the private key 26*a* and public key 26*b*, User 2 can authenticate themselves and initiate executing a computational action (block 54) on the blockchain.

In the example, a consensus computation is executed amongst the computer nodes 4 in the blockchain network 2 for the action initiated by User 1 or User 2, or both. If there is consensus or acceptance amongst the computer nodes, then a new block (e.g., Block N) is appended to the blockchain 10 recording that the computational action occurred.

Applicant herein recognizes however that the above existing computational system is technologically insecure.

For example, while convenient for User 1 that their private key 24*a* is stored on the data chain access server system 18, this means that an adversary (e.g., a hacker) that could bypass the data security measures of the data chain access server system 17 would have access to User 1's private key 24*a*. Alternatively, an adversary could steal User 1's login ID (e.g., name or email) and their password, and log into User Account 1.

For User 2, storing the private key 26*a* on separate device (like a USB key 16) also poses technical challenges. For example, an adversary can steal the USB key 16, which holds the private key 26*a*, and access User Account 2. Alternatively, User 2 can lose the USB key 16, thereby preventing User 2 from accessing their User Account 2 on the data chain access server system 17. This leads to loss and stranded accounts and digital assets.

These security problems also lead to account takeover and the creation of vulnerable smart contracts.

Furthermore, it is also herein recognized that when problems arise for a user, such as a hacked or compromised or lost device, or a hacked or compromised account, there are few technical recourses for the user. For example, the end user usability tools and process to attempt to recover a lost or stranded account is typically complex and, in most cases, these tools and processes are not available to an end user.

BRIEF DESCRIPTION OF THE DRAWINGS

Embodiments will now be described by way of example only with reference to the appended drawings wherein.

DETAILED DESCRIPTION

Figure 1:
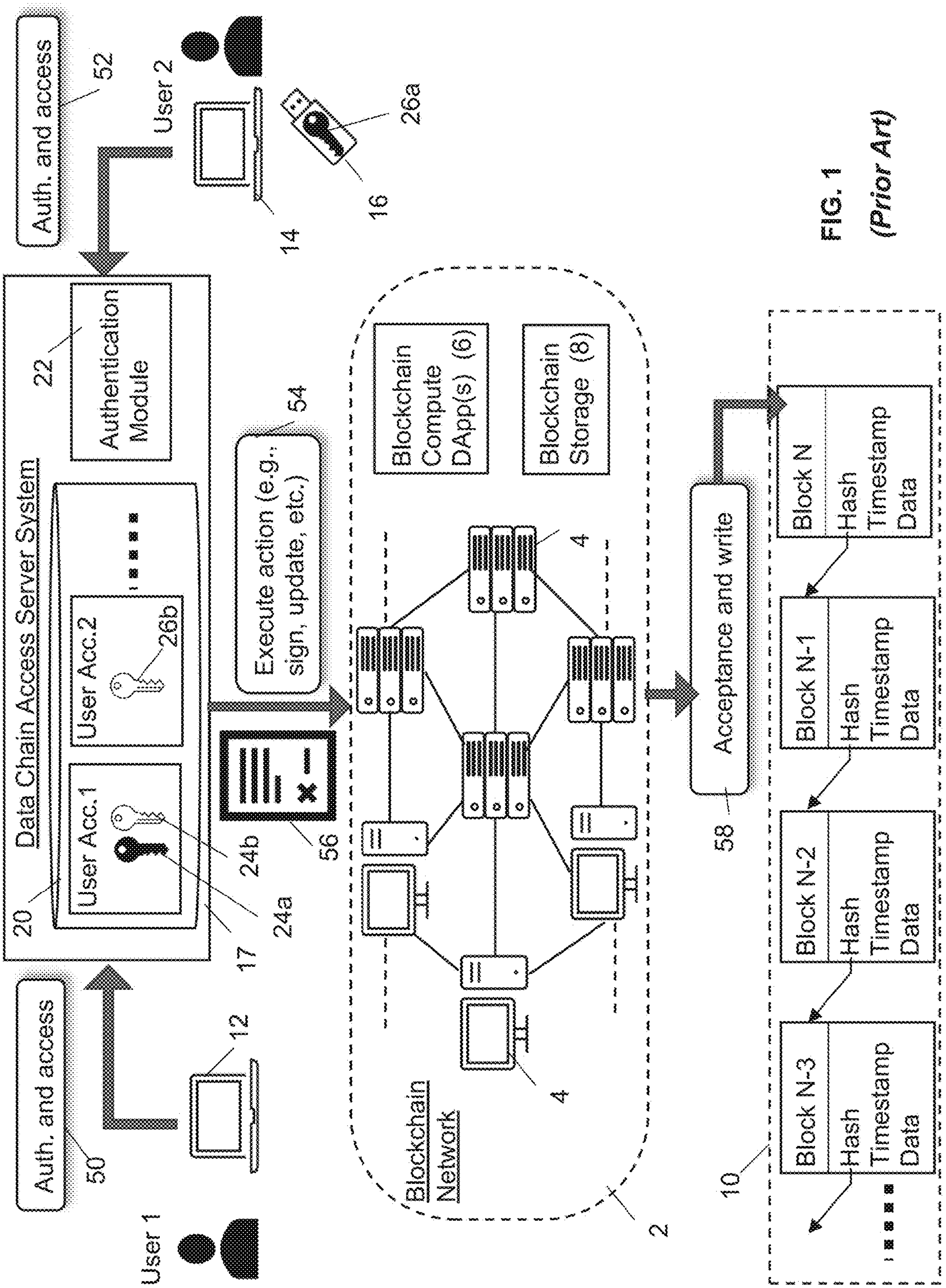
FIG. 1 (Prior Art)
FIG. 1 is a schematic diagram showing an existing system and process of accessing and writing onto a blockchain.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

Within this specification, different structural entities (which may variously be referred to as “nodes”, “units”, “circuits”, “systems”, “processors”, “module”, “interface”, other components, etc.) may be described or claimed as “configured” to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform one or more tasks during operation. A structure can be said to be “configured to” perform some task even if the structure is not currently being operated. A “biometric sensor configured to collect biometric data” is intended to cover, for example, an integrated circuit that has circuitry that performs this function during operation, even if the integrated circuit in question is not currently being used (e.g., a power supply is not powering it). Thus, an entity described or recited “configured to” perform some task refers to something physical, such as a device, circuit, memory storing program instructions executable to implement the task, etc. This phrase is not used herein to refer to something intangible. Thus, the “configured to” construct is not used herein refer to a software entity, such as an application programming interface (API).

The term “configured to” is not intended to mean “configurable to.” An unprogrammed Field Programmable Gate Array (FPGA), for example, would not be considered to be “configured to” execute some specific operation, although it may be “configurable to” perform that specific operation and may be “configured to” execute that specific function after programming.

Reciting in the appended claims that a structure is “configured to” perform one or more tasks is intended not to be interpreted as having means-plus-function elements.

Throughout the specification and the claims, the following terms take at least the meanings explicitly associated herein, unless the context clearly dictates otherwise. The term “or” is intended to mean an inclusive “or.” Further, the terms “a,” “an,” and “the” are intended to mean one or more unless specified otherwise or clear from the context to be directed to a singular form.

In this specification, numerous specific details have been set forth. It is to be understood, however, that implementations of the disclosed technology may be practiced without these specific details. In other instances, well-known methods, structures, and techniques have not been shown in detail in order not to obscure an understanding of this description. References to “for example”, “some examples,” “other examples,” “one example,” “an example,” “various examples,” “one embodiment,” “an embodiment,” “some embodiments,” “example embodiment,” “various embodiments,” “one implementation,” “an implementation,” “example implementation,” “various implementations,” “some implementations,” etc., indicate that the implementation(s) of the disclosed technology so described may include a particular feature, structure, or characteristic, but not every implementation necessarily includes the particular feature, structure, or characteristic. Further, repeated use of the phrases "in one example," "in one embodiment," or "in one implementation" does not necessarily refer to the same example, embodiment, or implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

As noted above in the Description of the Related Art, Applicant herein recognizes that there are technical problems related to the usage of blockchain technology. For example, user accounts are at a security risk for account take-overs. Users are subjected to smart contracts that they do not realize are vulnerable. Devices can be hacked or compromised through online wallets. Stranded or lost user accounts are very difficult to recover, including the accessing the user's profile and accessing any digital assets associated with the user account (e.g., contracts or smart contracts proving ownership). The end user usability is also limited. For example, to onboard a user, there are different steps that need to be taken across different platforms for different web browsers and different devices. Furthermore, device and software systems typically use manual confirmations for the end user via their wallets (e.g., online wallet) using low security factors. For example, the low security factors include username/password and sometimes multi-stepped authentication using email or text messaging, and are sometimes browser or device or operating system (or a combination thereof) dependent.

A strong authentication computing system is herein provided to address one or more of the above challenges. In an example aspect, a user credential module provides a graphical user interface to an end user that provides controls to create credentials. In another example aspect, the user credential module provides a GUI to an end user that provides controls to generate recovery options. In an example aspect, a user credential module provides a GUI to an end user that provides controls to create user accounts for a blockchain network based on their credentials and, if selected, recovery options. For example, the user account creation includes generating a code script that has embedded therein one or more credentials and, if selected, recovery options. The computing system processes the code script to derive and output a user account address for the end user. In an example aspect, a given credential is created using a strong authentication public key and private key pair, wherein the private key is securely stored on a device authenticator in an end user's device. In an example aspect, public key, which is part of the credential, is embedded in the code script.

In a further example aspect, the given credential includes a Fast Identity Online (FIDO2) public key, which is used to generate the user account for the end user, and the corresponding FIDO2 private key is securely stored on a device authenticator in the end user's device. It will be appreciated that FIDO2 refers to the accepted standards for online authentication specified by the FIDO Alliance.

In an example aspect, FIDO2 public keys and private keys are used as cryptographic credentials, and are applied to a blockchain using a Web Authentication standard called WebAuthn. It is herein recognized that the organization W3C has released an application programming interface (API) and standard for WebAuthn, which is supported by many web browsers to facilitate the creation and access of FIDO2 signatures. The WebAuthn API enables the creation and use of strong, attested, scoped, public key-based credentials by web applications, for the purpose of strongly authenticating users.

The use of FIDO2 protocols is a preferred example embodiment for authentication. Other types of authentication protocols that use public and private device authentication keys can also be applied to the principles described herein.

In a further example aspect, an end user has a first user account and a second user account, each with their own and different credentials. The user credential module, for example, provides a GUI to the end user to rekey a first user account to a second user account created using the user credential module, or to an external user account. After rekeying, the end user can use their credentials from the second user account to access the first user account and execute actions using the identity of the first user account.

Figure 2:
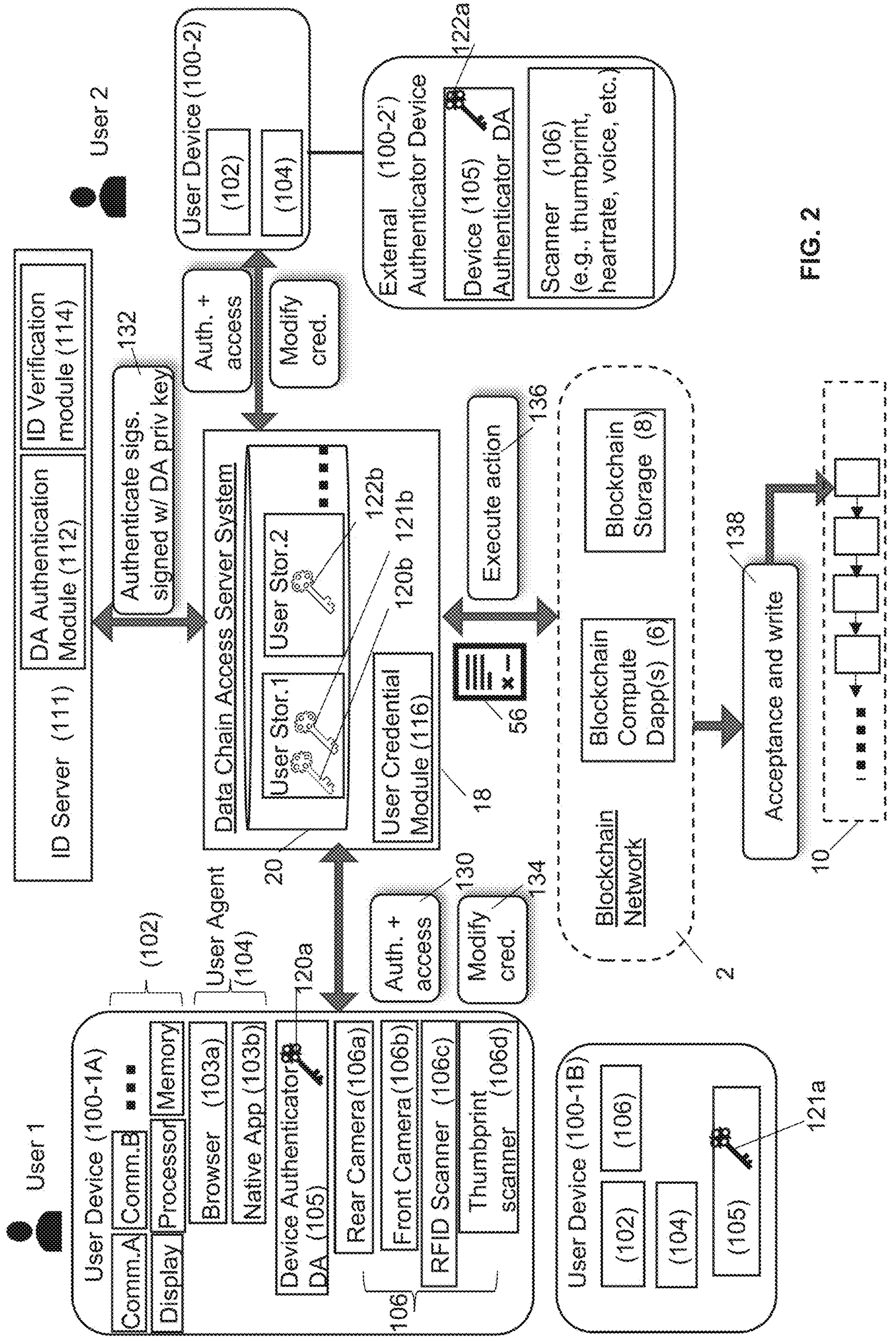
FIG. 2 is a schematic diagram showing a strong authentication system and process for accessing and writing onto a blockchain, according to an example embodiment.

Turning to FIG. 2, the computing architecture includes a user (e.g., User 1) and their user devices 100-1A and 100-1B. It will be appreciated that the reference numeral "100" herein refers to a user device, and the suffix in the form "-1A" or "-1B" and the like is used to denote a specific user device. Examples of user devices 100 include mobile devices, laptops, desktop computers, tablets, smart phones, etc. A user device 100 includes hardware components 102, examples of which include a processor (also called a processing system), memory, a communication module (e.g., for communicating via a cell network, WiFi, LAN, WAN, etc.), and a user interface (e.g., display screen, touch interface, keyboard, mouse, etc.). In an example embodiment, one communication module (e.g., Comm.A in FIG. 1) is for WiFi communication. In another example embodiment, another communication (e.g., Comm.B in FIG. 1) is for cell network communication. These hardware components 102 can vary in type, number and architecture as user devices continue to develop. In an example aspect, the user device 100 includes a browser 103*a*, or a native application (also called an app) 103*b*, or both. The browser 103*a* or the native app 103*b*, or both, are more generally herein referred to as the user agent 104. The user agent 104 displays a GUI on a display screen to guide the user through the authentication process and the related action (e.g., logging in, executing a command, creating an account, keying an account, rekeying an account, authenticating a computational action to be recorded on the blockchain, etc.).

The user device 100 also includes a device authenticator (DA) 105, which is used to store user-identifying data on the device in a secure manner and to authenticate the user. In an example aspect, the hardware-based device authenticator 105 includes a secure execution and secure storage environment, which can be implemented using one or more of: a Trusted Execution Environment (TEE); a secure element, a firewall; a software layer; a secure enclave; a Hardware Secure Module (HSM); etc. It will be appreciated that a TEE is a computing chip that, for example, exists on a processor device. It will be appreciated that a HSM is a separated computing appliance. Preferably, in an example embodiment, the device authenticator is a secure hardware component that also includes software security. Authentication data about a user 101 can be stored in the device authenticator. The authentication data about the user, for example, includes a device authentication private key (also referred to as a DA private key) associated with the user 101 and the device authenticator 105 of the device 100. In an example aspect of using the FIDO protocol, the DA private key is known as a FIDO2 private key. In another example aspect, the device authenticator may also store other data, including, but not limited to: biometric authentication data, passwords, security codes, name, address, account numbers (e.g. like a primary account number (PAN), driver's license number, etc.), age, date of birth, citizenship, and other credentials.

The user device may also include one or more scanners 106. Examples of scanners 106 includes a rear camera 106*a*, a front camera 106*b*, a radio frequency identification (RFID) scanner 106*c*, a thumbprint scanner 106*d*, a heartrate monitor, a microphone for voice detection, etc. In an example embodiment, a face scanning system includes a dot projector that projects infrared dots on a person's face and an infrared camera takes an image of the face and the dots. It is appreciated that currently known and future known scanners can be used to verify that the correct person is truly interacting with their user device.

The device authenticator 105, for example, interacts with a scanner 106 to obtain identifying data about the user, and compares the scanned identifying data about the user with stored identifying data about the user. For example, the identifying data about the user is biometric authentication data, including and not limited to one or more of: fingerprint scan, eye scan, facial recognition, voice recognition, heartbeat or pulse monitoring, DNA sampling, body temperature, etc. The scanner 106 includes one or more sensors that can capture the biometric authentication data. In other words, the scanner 106 includes a biometric sensor that captures biometric data of a user, according to an example embodiment.

In preferred example embodiments, the processes described herein use a scanner 106. It will also be appreciated that the identifying information about the user can include data that is not biometric in nature. For example, other identifying information includes a password, a pin, a swipe pattern, a code, etc.

Continuing with FIG. 2, in an example embodiment, the device authenticator 105 and the one or more scanners 106 are built into the user device 100.

In another example embodiment, User 2 has a different type of user device 100-2 that can releasably connect to an external authenticator device 100-2'. The device authenticator 105 and the scanner 106 are part of an external authenticator device 100-2', and when the external device authenticator 100-2' is in data communication with the user device 100-2, the collective user device is able to perform strong authentication using the DA private key (e.g., also called the FIDO2 private key in an embodiment using the FIDO2 protocol) that is stored on the device authenticator 105. For example, the external authenticator device 100-2' is connected to the user device 100-2 via a wire or some other electrical connection (e.g., USB port). In another example, the external authenticator device 100-2' is connected to the user device 100-2 via wireless communication. Examples of wireless communication include Bluetooth, Near Field Communication, and WiFi. Example embodiments of an external authenticator device 100-2' include a smart watch, a USB key, a dongle, and a smartphone. The term "user device" collectively also refers to the user device 100-2 and an external authenticator device 100-2', in example embodiments that include an external authenticator device.

The user devices 100, a data chain access server system 18, and an identity (ID) server system 111 (interchangeably referred to as an ID server) are in data communication with each other over a data network, such as the Internet. The data chain access server system 18 of the present invention is also herein interchangeably referred to as an access server system.

The ID server 111 executes processes that establish and attests to the identity of a user. The ID server 111 includes a DA authentication module 112 that attests to the authentication of a user by sending a challenge to the user device of the user, receiving a response to the challenge that is signed by the device authenticator 105 of the user device, and authenticating the response using the FIDO protocol. In an example aspect, for new users, the ID Server also executes a registration process that includes verifying biometric data.

In the examples provided herein, an initial condition may already be established that includes a device authentication private key (also herein called a DA private key) being securely stored on the device authenticator 105, and the corresponding device authentication public key being stored on the ID server 111. The generation and storage of these keys, for example, adhere to the FIDO protocols developed by the FIDO Alliance. In an example aspect, the device authenticator generates the device authenticator private key and the device authenticator public key, and the device authenticator sends the device authenticator public key to the ID server 111 for storage. The device authentication private key can be used to sign responses. These signed responses can include other data, depending on the application. For example, signed responses can include account data, authorization data, commands, transaction details, etc.

In an example aspect, the ID server system further includes an identity verification module 114 to establish a user's identity. For example, the ID server verifies the identity of the user by comparing facial biometrics that are obtained by a scanner 106 (such as a camera or a LIDAR sensor, or both) against a trusted government credential (e.g., a passport, a driver license, etc.). Other types of biometric data and other types of trusted credential documents can be used to compute a comparison.

It will be appreciated that modules 112, 114 include executable instructions stored in memory on the ID server system, and the processors in the ID server system execute these executable instructions. These modules 112, 114 also include secure storage devices for storing data, such as cryptographic keys and user or account information (or both).

The data chain access server system 18 (also called an access server system) includes a database 20 that stores DA public keys (e.g., also called FIDO2 public keys in an embodiment using the FIDO2 protocol). For example, for User 1's storage, the database stores a DA public key 120*b* and a DA public key 121*b*. In an example aspect, these public keys 120*b* and 121*b* are embedded within a code script used to verify User 1. In relation to the DA public key 120*b*, the corresponding DA private key 120*a* (e.g., FIDO2 private key in an embodiment using the FIDO2 protocol) is stored in the device authenticator 105 on User 1's user device 100-1A. In relation to the DA public key 121*b*, the corresponding DA private key 121*a* (e.g., FIDO2 private key) is stored in the device authenticator 105 on User 1's other user device 100-1B. Each DA public key (or combination of public keys) can be used to form a different credential.

For User 2's storage on the database 20, a DA public key 122*b* is stored thereon. In an example aspect, the public key 122*b* is embedded within a code script used to verify User 2. In relation to the DA public key 122*b*, the corresponding DA private key 122*a* (e.g., FIDO2 private key) is stored in the device authenticator 105 on User 2's user device, or more specifically the external authenticator device 100-2'.

In an example embodiment, User 1 uses either user device 100-1A or 100-1B to authenticate themselves and access the data chain access server system (block 130). This authentication, for example, includes the user device provides an identifier o the data chain access server system 18 or to the ID server 111 (or both), and the user device receiving a challenge from at least one of the server systems 18 and 111. In response to the challenge, the user device provides strong authentication, such as by scanning a biometric aspect of themselves using a scanner 106 (e.g., a facial biometric, a thumbprint biometric, etc.). If the scanned biometric data is correct, the device authenticator 105 uses the DA private key to sign the challenge and return the signed challenge to at least one of the server systems 18 and 111. Using the corresponding DA public key, at least one of the server systems 18 and 111 verify the signature of the challenge, to confirm that the signature of the challenge was signed using the correct corresponding DA private key. In an example aspect, the DA authentication module 112 executes the authentication computation (block 132). In an alternative aspect, the modules and computations of the ID server are integrated into the data chain access server system 18, including the authentication computations. After authentication is successfully completed, User 1 can access their account information via their user device.

After the user device 100-1A (or the user device 100-1B) has gained access to the data chain access server system 18, the user device can interact with the user credential module 116 to create credentials, modify credentials, create user accounts, and modify user accounts (block 134).

Using one or more credentials and one or more accounts, the user can execute an action using a dApp on the blockchain network 2. For example, the action includes signing a smart contract 56 using a DA private key 120*a* stored on the device authenticator 105 of the user device 100-1A (block 136). After the computer nodes in the blockchain network reach a consensus in their computation, the action is recorded and written in a new block on the blockchain 10 (block 138).

Similar computations are executed by User 2's user device 100-2 and the server systems 18 and 111 to authenticate the user device 100-2 and access the data chain access server system 18. User 2 can also use their user device to interact with the user credential module 116 to create credentials, modify credentials, create user accounts, and modify user accounts (block 134). Similarly, the user evidence 100-2 can also be used to initiate or authenticate an action to be executed by the blockchain network 2.

Figure 3:
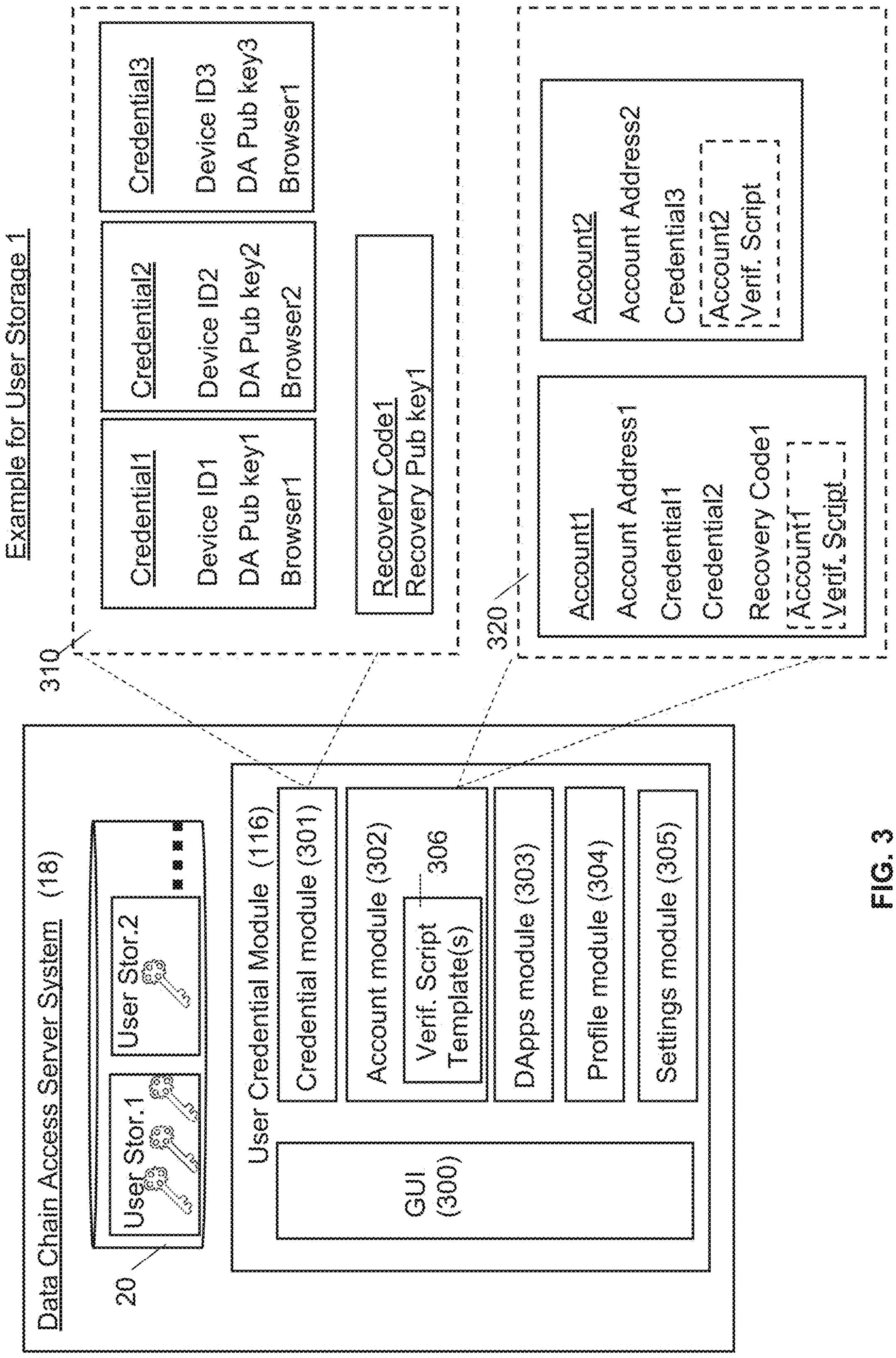
FIG. 3 is schematic diagram showing program components and data components of a data chain access server system, according to an example embodiment.

FIG. 3 is an example embodiment of data and software components of a data chain access server system 18, also herein called an access server system. It includes a database 20 that stores data about each user, including their credentials, accounts, associated dApps, profile information, and setting information.

The user credential module 116, hosted by the server system 18, includes a GUI module 300 for providing a GUI that is displayable on a user device, and that can access one or more subset modules that are part of the module 300. These subset modules include a credential module 301, an account module 302, a dApps module 303, a profile module 304, and a settings module 305. It will be appreciated that the software architecture allows these modules 300, 301, 302, 303, 304, 305 to exchange information (e.g., settings, intermediate outputs, user data, etc.) amongst each other.

One or more verification script templates 306 are stored in the account module 302, or are stored in a database accessible by the user credential module 116. The verification script template includes executable code for verifying a user account, and which can be automatically modified to verify specific credentials associated with the user account. The resulting modified verification script is also herein interchangeably referred to as a code script, a verification script, or simply, a script.

In an example embodiment for User 1, credential data 310 has been setup by User 1, using their user devices. In this example, User 1 owns multiple user devices each identified by their own device ID. For example, User 1 owns: an iPhone® by Apple identifiable as device ID1; a MacBook® by Apple identifiable as device ID2; and a Windows® laptop identifiable as device ID3. Each of these user devices includes a device authenticator 105 that securely stores thereon a different DA private key. Each of these user devices also has stored thereon a web browser application 103*a* (also herein called a user agent 104). Commonly used web browser applications include Google Chrome®, Mozilla Firefox®, and Microsoft Edge®. Other web browsers, both currently known and future known may be used. Different web browsers can be used to form the credential. In an example embodiment, the combination of a device ID, a DA public key that corresponds to a DA private key stored on the device with the same device ID, and a web browser identifier is used to form a credential.

In some user devices, a single DA credential (e.g., DA public key and DA private key) is associated with a given user device. In other user devices, the operating system allows for different DA credentials to be associated with the same given user device; such as a first DA public key and first DA private key associated with a first web browser, and a second DA public key and second DA private key associated with a second web browser, which are both on the same given user device.

Continuing with FIG. 3, User 1 has setup, via the GUI 300, Credential1, which includes device ID1, DA public key1 (with the corresponding DA private key1 stored on the device authenticator of the user device identified as device ID1), and the identity of web browser1 that is installed on the user device identifies as device ID1. Credential2 is also associated with User 1, and Credential2 includes: device ID2, DA public key2 (with the corresponding DA private key2 stored on the device authenticator of the user device identified as device ID2), and the identity of web browser2 that is installed on the user device identified as device ID2. Credential2 is also associated with User 1, and Credential3 includes: device ID3, DA public key3 (with the corresponding DA private key3 stored on the device authenticator of the user device identified as device ID3), and the identity of web browser3 that is installed on the user device identified as device ID3.

Although not shown, in another example aspect, a Credential4 associated with User 1 includes: device ID3, DA public key4 (with the corresponding DA private key4 stored on the device authenticator the same user device identified as device ID3), and the identify of web browser2 stored on the same user device identified as device ID3. In other words, if the device operating system (OS) permits, two DA public and private key pairs can be associated with the same device, but linked to different web browsers on the same device. This can be used to create a second credential for the same user device.

Also stored in the credential data 310 for User 1 is a Recovery Code1, which includes a recovery public key. The corresponding recovery private key is a code that is displayed or provided one time to User 1 via their user device. For example, the corresponding recovery code is an alphanumeric code, or a pass phrase, or a mnemonic phrase.

Continuing with FIG. 3, account data 320 is provided for User 1, which is stored in the database 20 and accessed at least by the account module 302. A user account is associated with a credential, and more specifically a public and private key pair associated with the user. The credential is used to cryptographically and digitally sign an action to be executed, also herein called a requested action, producing a digital signature associated with the action, and the record of the action is verified on the blockchain network using the digital signature. In other words, the record of the action is linked to the user account that permitted or confirmed the action, and this record is stored in a block on the blockchain. The user account that can be created and modified by the user credential module 116 is also herein called a blockchain user account. In an example aspect, the public and private key pair correspond to a FIDO2 public and private key pair, and the digital signature is a FIDO2 signature.

User 1 has an Account1 and an Account2 in the account data. Account1 includes: Account Address1, Credential1, Credential2, and Recovery Code1. This means that User 1 can use any one of Credential1, Credential2 and Recovery Code1 to access their Account1 and perform actions using Account1. The Account1 is identifiable by Account Address1. In an example aspect, Account Address1 is derived from a code script, and the code script has embedded therein DA pub key1 of Credential1, DA public key2 of Credential2 and the Recovery Public Key1 of Recovery Code1. The code script, also herein called the verification script, for Account1 is called Account1 Verification Script, which is automatically created using the verification script template 306. In an example aspect, Account1 Verification Script is stored in association with Account1.

Account2 includes: Account Address2 and Credential3. This means that User 1 can use Credential3 to access their Account2 and perform actions using Account2. The Account2 is identifiable by Account Address2. In an example aspect, Account Address2 is derived from a code script, and the code script has embedded therein DA pub key3 of Credential3. In this example, the code script is Account2 Verification Script, and the Account Address2 is derived from the Account2 Verification Script.

It will be appreciated that User 1 can access the user credential module 116 to create multiple blockchain user accounts, and to rekey a given blockchain user account.

Figure 4:
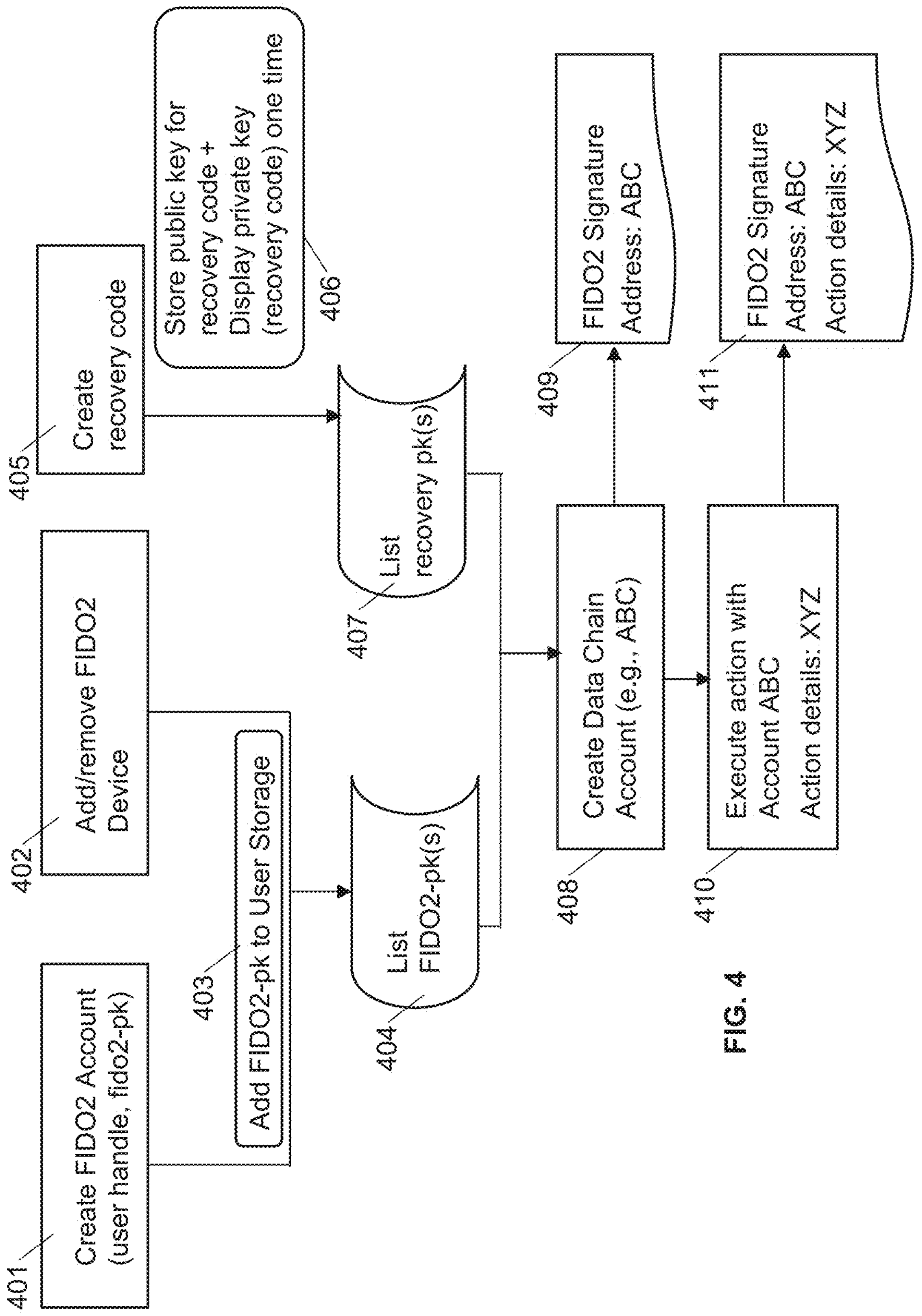
FIG. 4 is a flow diagram of computer executable instructions for FIDO2 signature creation using user accounts, according to an example embodiment.

Turning to FIG. 4, an example embodiment of a computer executable process is provided for FIDO2 signature creation using the data chain access server system 18 and the ID server system 111.

At block 401, the user device 100 create a FIDO2 account that includes a user handle, a FIDO2 public key, and FIDO2 private key. The FIDO2 private key is stored on the device authenticator of the user device.

In an example aspect, the FIDO2 private key and public key pair are created using on the user device 100. For example, the user registers or logs into the user credential module 116 using their user device 100, via the GUI 300. As part of the process of creating a credential using the GUI 300, the ID server 111 initiates an attestation challenge to be sent to the user device. The user device confirms the challenge by using identity verification, such as a biometric verification using a biometric sensor, or more generally a scanner 106. In the process, the user device generates the FIDO2 private key and public key pair. The FIDO2 private key is stored in the user device 100, in its device authenticator. The user device transmits the FIDO2 public key and the attestation result (e.g., the signed challenge) to the ID server 111. The ID server 111 validates the attestation result and stores the user's FIDO2 public key. After the attestation result is validated by the ID server 111, the ID server 111 sends the FIDO2 public key to the data chain access server system 18 for storage in the database 20.

At block 402, using the GUI 300, the user adds or removes one or more FIDO2 credentials to or from a blockchain user account. A FIDO2 credential includes a FIDO2 public key (which corresponds to a FIDO2 private key stored on the user's user device), a device ID, and a web browser ID or web browser type.

At block 403, the data chain access server system adds the selected FIDO2 public key to the user's storage in relation to a blockchain user account. At block 404, the credential associated with the FIDO2 public key is listed in the GUI 300 in association with the blockchain user account.

The user can optionally use the GUI 300 to create a recovery code (block 405). Using the GUI 300, the user requests that the data chain access server system 18 generate a recovery code. In response, the data chain access server system creates a recovery public key and a corresponding recovery private key. The corresponding recovery private key is a code (e.g., an alphanumeric code or a string of text) that is displayed one time to the user via the GUI 300, which is viewable on the display screen of the user's user device (block 406).

The recovery public key is listed in association with the blockchain user account, along with the one or more FIDO2 public keys assigned to the same blockchain user account (block 407).

At block 408, the data chain access server system 18 then creates the data chain account. For example, it has the user account address ABC. Using one of the FIDO public keys associated with the blockchain user account, the data chain access server system 18 and the user device 100 (which stores the corresponding FIDO private key in a device authenticator) execute a FIDO2 signature of the account address (block 409).

At block 410, the user device uses their blockchain user account (e.g., with the account address ABC) to execute a computational action XYZ. In an example embodiment, this computational action is authenticated by the data chain access server system 18 (or some other server node that has access to the FIDO2 public key) by initiating a challenge that includes the computational action details XYZ and the user account address ABC, and this challenge is signed by the user device using the FIDO2 private key. This results in an authenticated response that includes the FIDO2 signature, the user account address ABC, and the computational action details XYZ (block 411).

Figure 5:
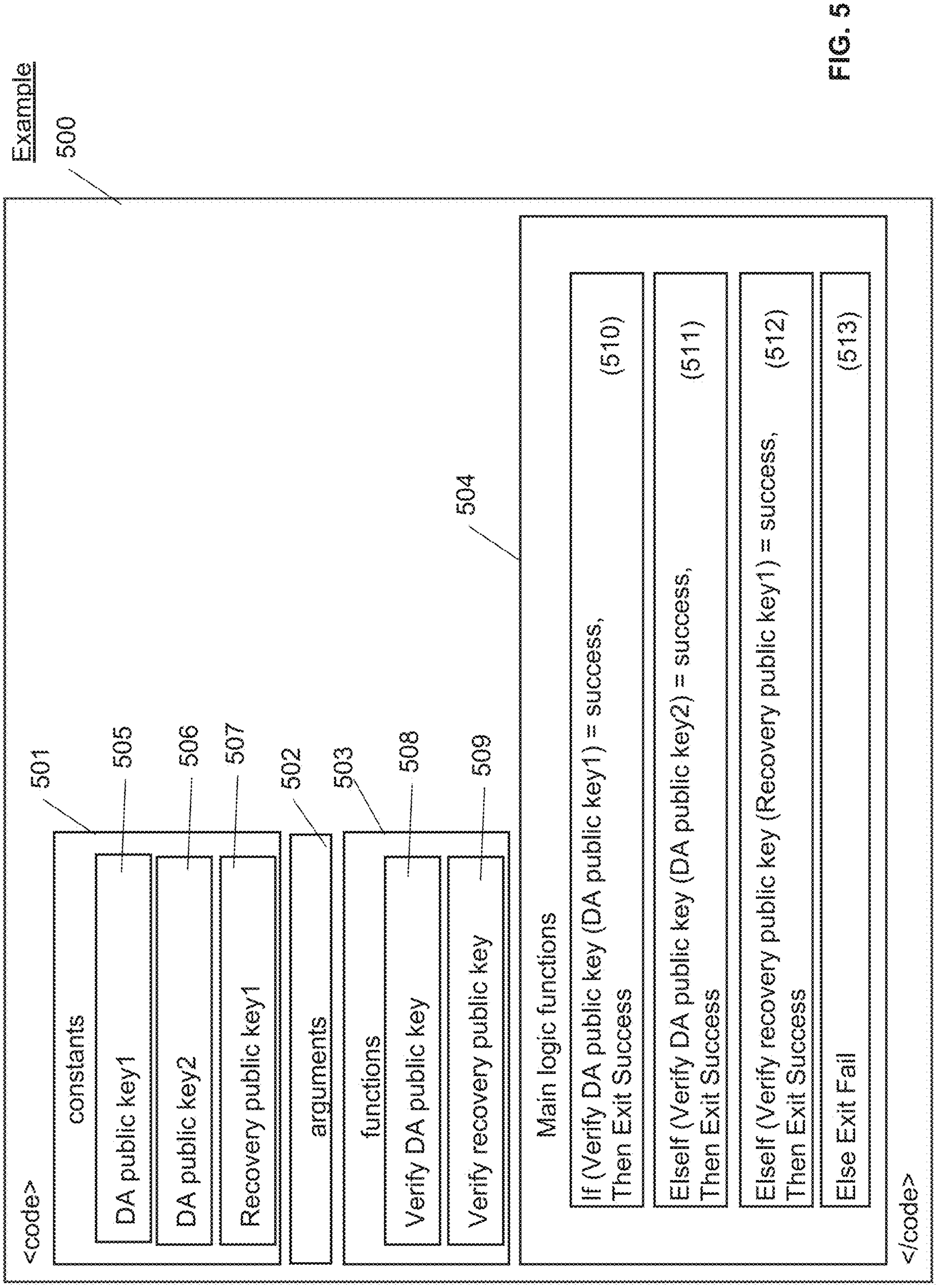
FIG. 5 is a diagram of computer executable instructions in the form of a script for verifying digital signatures signed by a user device with FIDO2 public key and private key credentials, according to an example embodiment.

In an example embodiment, the process at block 408 of creating a blockchain user account includes generating a code script using the one or more credentials, and optionally a recovery code. Turning to FIG. 5, an example embodiment of a code script 500 (also herein called a script or a verification script) that includes representative data components is provided. This code script 500 is executable by a computer (e.g., a server system) to verify that the digital signature is signed by the user device with the correct corresponding FIDO2 private key.

The code script 500 includes one or more constants 501, one or more arguments 502, and one or more functions 503. These constants, arguments and functions are passed into the main logic function 504.

In this example, the user has selected Credential1, Credential2 and Recovery Code1 to be assigned to their Account1. See for example FIG. 3. Accordingly, in the script 500, the constants include a DA public key1 505 that corresponds to Credential1, DA public key2 506 that corresponds to Credential2, and Recovery public key1 507 that corresponds to the Recovery code1. As noted above, in an example embodiment that adheres to the FIDO protocol, the DA public keys are FIDO2 public keys.

The functions include verifying a DA public key 508 and verifying a recovery public key 509.

The main logic functions include one or more conditions that call on a verification function. For example, the logic functions include an If condition 510 that if the DA public key1 505 is successfully verified, then the program exits and returns a successful output. Or else, the If condition 511 is activated, which determines that if the DA public key2 506 is successfully verified, then the program exits and returns a successful output. Or else, the If condition 512 is activated, which determines that if the Recovery public key1 is successfully verified, then the program exits and returns a successfully output. Or else, the program exits and returns a fail output (513).

The main logic functions include a waterfall of If conditions tied to verifying the one or more credentials. Optionally, in the embodiment that a recovery option has been assigned to the blockchain user account, then the last condition includes verifying the recovery public key.

It will be appreciated that verifying a DA public key, such as DA public key1, includes the ID server system 111 or the data chain access server system 18 sending a challenge to the user device that has stored thereon the corresponding DA private key1 (e.g., stored in the device authenticator of the user device); the user device executing an authentication, such as a biometric authentication, of the user; after successfully completing the user authentication, using the DA private key to sign the challenge; the user device returning the signed challenged back to the ID server system 111 or the data chain access server system 18; and, the ID server system 111 or the data chain access server system 18 using the DA private key1 and the challenge to verify the signature. The verification can be successful or can fail. In an example embodiment, the verification of the DA public key adheres to the FIDO authentication protocol.

an example aspect, verifying the Recovery public key1 includes requesting, via the GUI 300, that the user input their code that is the Recovery private key. If the correct code is inputted, then the user can recover access to their blockchain user account.

In an example embodiment, another format of the code script 500 is provided below.

```
<code>
// constants
fido2_pk1 = Bytes("base64", "public key value") // fido2 public key device 1
fido2_pk2 = Bytes("base64", "public key value") // fido2 public key device 2
recovery_pk = Bytes("base64", "public key value")
// arguments
signature = Arg(0) /// base64
clientDataJson = Arg (1) /// base64
authData = Arg (2) /// base64
server_challenge = Arg(3) /// base64
// functions
@Subroutine(ProgramType.uint64)
def verify_fido(pubkey):
   challenge = concat (Txn.tx_id( ), trx.lease, server_challenge)
   compute_challenge = base64url_encode(challenge)
   extract_challenge = json_extract(clientDataJson, "challenge") /// extract challenge will be
   base64url
   format
   message = concat( authData , sha256(clientDataJson))
   return And(compute_challenge == extract_challenge, ecdsa_verify ( message,
   signature, pubkey))
@Subroutine(ProgramType.uint64)
def verify_recovery(pubkey):
   return And(Txn.type_enum( ) == TxnType.KeyRegistration , Ed25519Verify( Txn.tx_id( ),
signature, pubkey))
// main logic functions
def main( ):
   return (
      If(verify_fido(fido2_pk1))
      .Then(Int(1)) # exit success if fido2_pk1 successful
      ElseIf(verify_fido(fido2_pk2))
      .Then(Int(1)) # exit success if fido2_pk2 successful
      .ElseIf(verify_recovery(recovery_pk))
      .Then(Int(1)) # exit success if recovery successful
      .Else(Int(0)) // exit fail
)
</code>
```

In an example aspect, base64url_encode is a function that encode bytes value into base64url format. In another example aspect, json_extract is a function that extract the value of given key from a json data. In another example aspect, ecdsa_verify is a function that verifies an elliptic curve digital signature algorithm (ECDSA) signature. In another example aspect, a Rivest-Shamir-Adleman (RSA) signature is used in the FIDO verification. Therefore, alternatively, rsa_verify is used, which is a function that verifies a RSA signature. Other types of public-key algorithms can be used.

As can be seen in the script 500, the constants include the DA public key(s) of the credential(s) and, in some cases, a recovery public key. This makes the script unique. In a further example aspect, the script 500 is used to derive the address of the blockchain user account. For example, the data chain access server system 18 inputs the script 500 into a hash function to compute a hash of certain data format. The resulting hash is the address of the blockchain user account.

In other words, in the above example embodiment, forming the script 500 and computing the address using the script 500 are part of the computations to create the blockchain user account.

Figure 6:
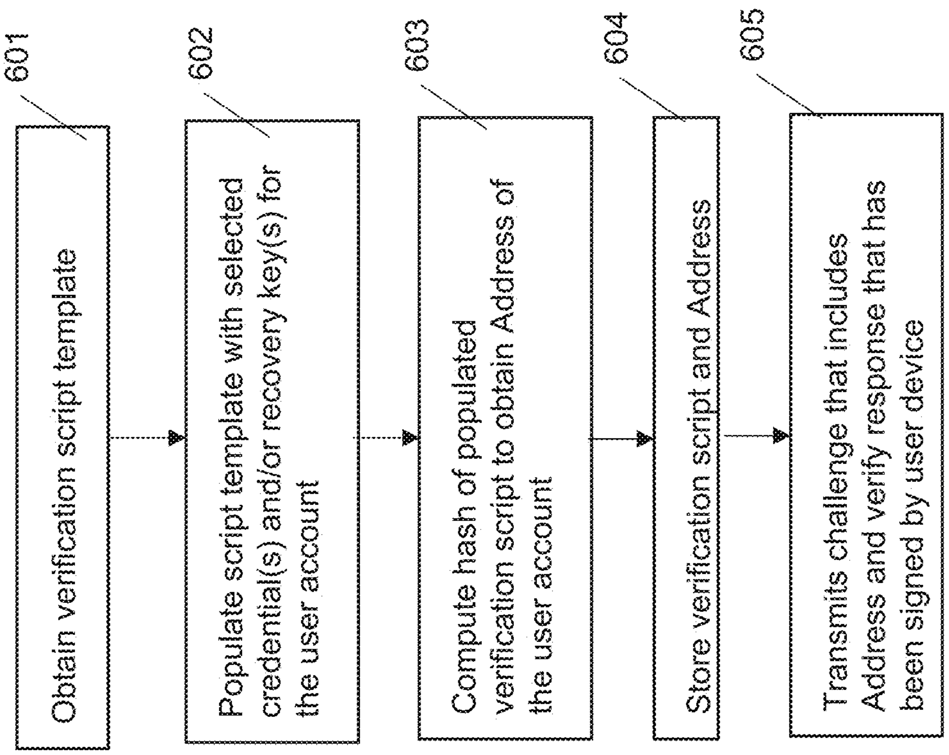
FIG. 6 is a flow diagram of computer executable instructions for creating a data chain user account, according to an example embodiment.

Turning to FIG. 6, an example of computer executable instructions for creating a blockchain user account is provided.

At block 601, the data chain access server system 18 obtains a verification script template 306. For example, the template includes the arguments, the functions, and possible logic functions for the main logic functions.

At block 602, the server system 18 populates the verification script template with the one or more credentials of the user account. For example, the one or more credentials include one or more DA public keys. Optionally, a recovery public key is also included into the script. These one or more public keys are stored as constants in the script and can be each called upon as a parameter in a public key verification function defined in the verification script.

At block 603, the server system 18 computes a hash of the populated verification script to obtain an address of the blockchain user account.

At block 604, the server system 18 stores the verification script and the address of the blockchain user account.

At block 605, the server system 18 transmits a challenge that includes the address of the blockchain user account to the user device, and the user device digitally signs the challenge using DA private key corresponding to a DA public key that has been embedded into the script.

It will further be appreciated that systems described herein facilitate multiple credentials being associated with a single blockchain user account. Further, a user can use the GUI 300 to select which one or more credentials are mapped to a given blockchain user account. In many existing blockchain systems, there is only one credential per user account. In the systems provided herein, however, as multiple credentials are associated with a given blockchain user account, the user has the flexibility to choose which credential to use to access their account the data chain access server system. In the example script 500, the user can use their DA private key associated with the DA public key1 505 which is stored on a first user device, or their DA private key associated with the DA public key2 506 which is stored on a second user device. In other words, the user can use either one of their first user device or their second user device to authenticate a computational action, for example, using FIDO authentication.

In an example aspect, the data access server system 18 provides a GUI 300 that is configured to be displayed by a user device 100-1 operable to connect to the data access server system. The data access server system receives an input via the GUI 300 to create a credential that is associated with, or comprises, a device authenticator public key and a device ID of the user device. In a further example aspect, the credential is also associated with, or further comprises, a web browser ID that is operating on the user device. This credential is stored in the user credential module 116. A device authenticator private key corresponds to the device authenticator public key is stored on the user device. The data access server system 18 receives another input via the GUI 300 to create a user account that comprises the credential. The data access server system 18 automatically generates a code script for verifying the user account, the code script comprising the device authenticator public key. The data access server system 18 also automatically generates a user account address of the user account using the code script.

Figure 7A:
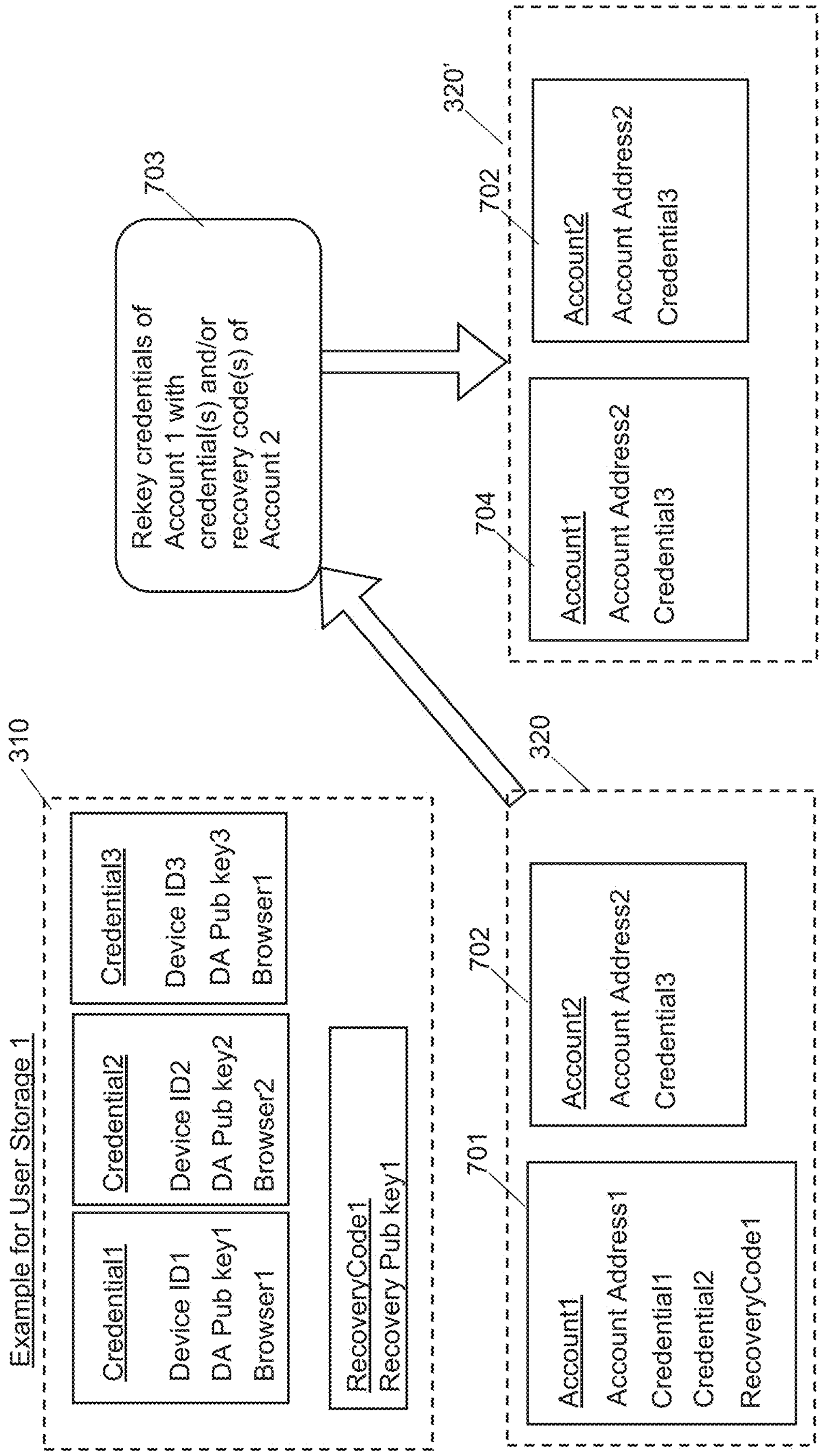
FIG. 7A is a schematic diagram for rekeying a first account with one or more credentials of a second account from the perspective of a user of both accounts, according to an example embodiment.

Turning to FIG. 7A, the GUI 300 also includes controls that allow a user to rekey a blockchain user account. For example, if a first user account becomes compromised, or if the credentials or recovery key becomes unavailable or lost, then the user can rekey the first account with the credentials of a second user account. In this way, the user can execute actions using the first account address, but with the one or more credentials of the second user account.

In FIG. 7A, the example of the User Storage for User 1 is shown, including the credential data 310 and the account data 320. These were described with respect to FIG. 3. Before rekeying, blockchain User Account1 701 includes Account Address1, Credential1, Credential2, and RecoveryCode1. Further, blockchain User Account2 includes Account Address2 and Credential3.

In response to a command, such as a command inputted via the GUI 300, the data chain access server system 18 rekeys the credentials of User Account1 701 with the one or more credentials (and if applicable, a recovery code) of User Account2 702 (block 703).

From the user's perspective, their account data 320' after rekeying shows that User Account1 704 includes Account Address2 and Credential3. In another example embodiment, the GUI 300 shows that Account Address1 with rekeyed with Account Address2, and the one or more credentials associated with Account Address2. In another example aspect, User Account2 remains. Alternatively, it is removed from the GUI 300.

In this way, from the user's perspective, they can continue to use blockchain User Account1 to execute actions and authenticate those actions using Credential3. This is helpful if User1 loses or no longer can access their first user device that holds the DA private key corresponding to Credential1; loses or no longer can access their second user device that holds the DA private key corresponding to Credential2; and forgets or loses their recovery private key for RecoveryCode1. After rekeying, User1 can use a new device, such as a third user device that holds the DA private key corresponding to Credential3, to execute actions on the blockchain under blockchain User Account1.

Figure 7B:
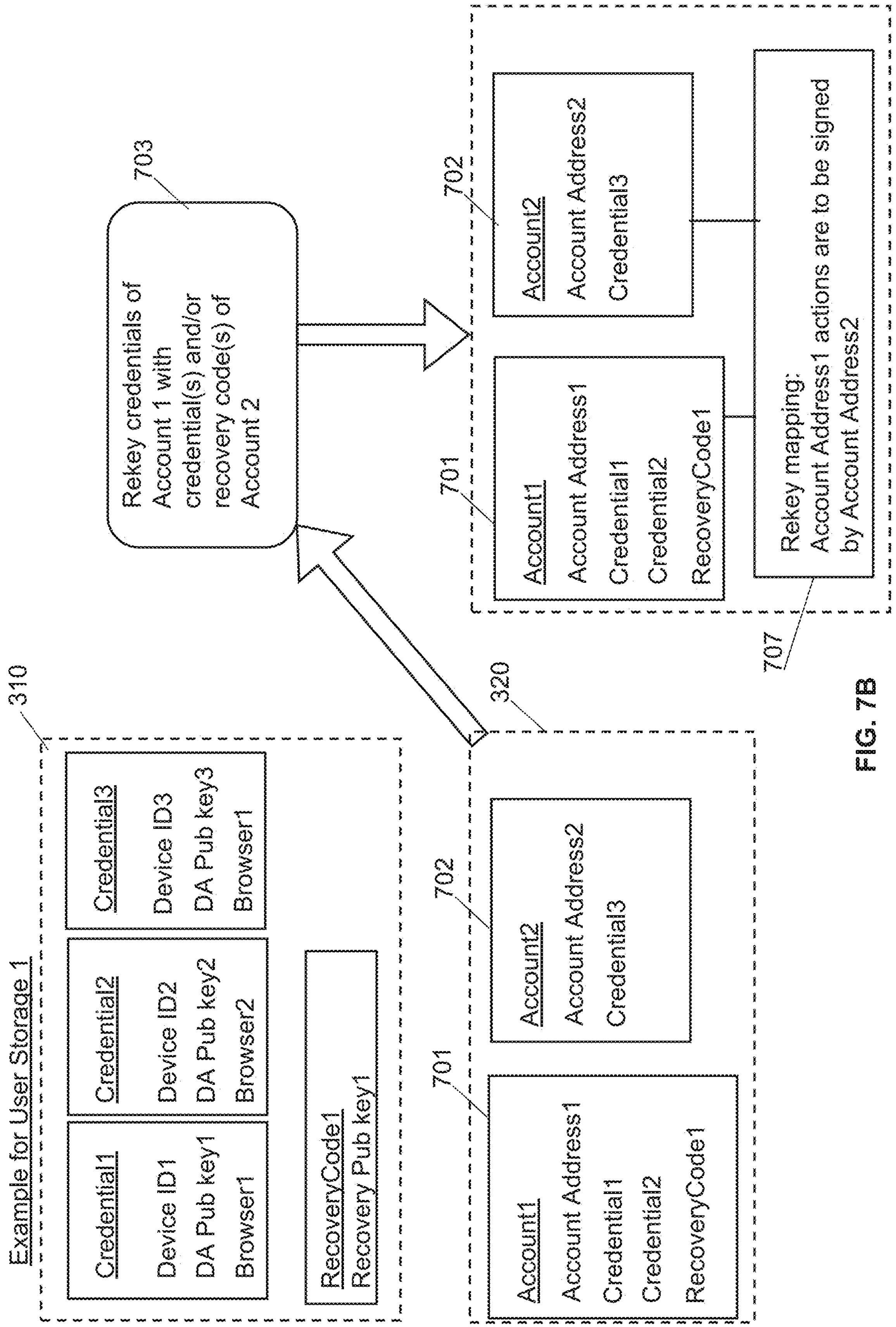
FIG. 7B is a schematic diagram for rekeying the first account with one or more credentials of the second account as executed by the data chain access server system, according to an example embodiment.

As shown in FIG. 7B, while not shown in the GUI 300, the data chain access server system 18 keeps or retains blockchain User Account1 701 and keeps blockchain User Account2 702 after the rekeying process. A rekey mapping 707 is generated and stored in association with both of the User Accounts 701 and 702. The rekey mapping 707 includes the mapping that the Account Address1 action are to be signed by Account Address2 and its related one or more credentials. In other words, the address of User Account1 remains as an identifier for computational actions recorded on the blockchain, and the User Account2 address (i.e., Account Address2) and its credential (i.e., Credential3) are a proxy account required for authentication of the computational actions on behalf of User Account1. In an example aspect, the rekey mapping is stored in the code script associated with User Account1.

Figure 7C:
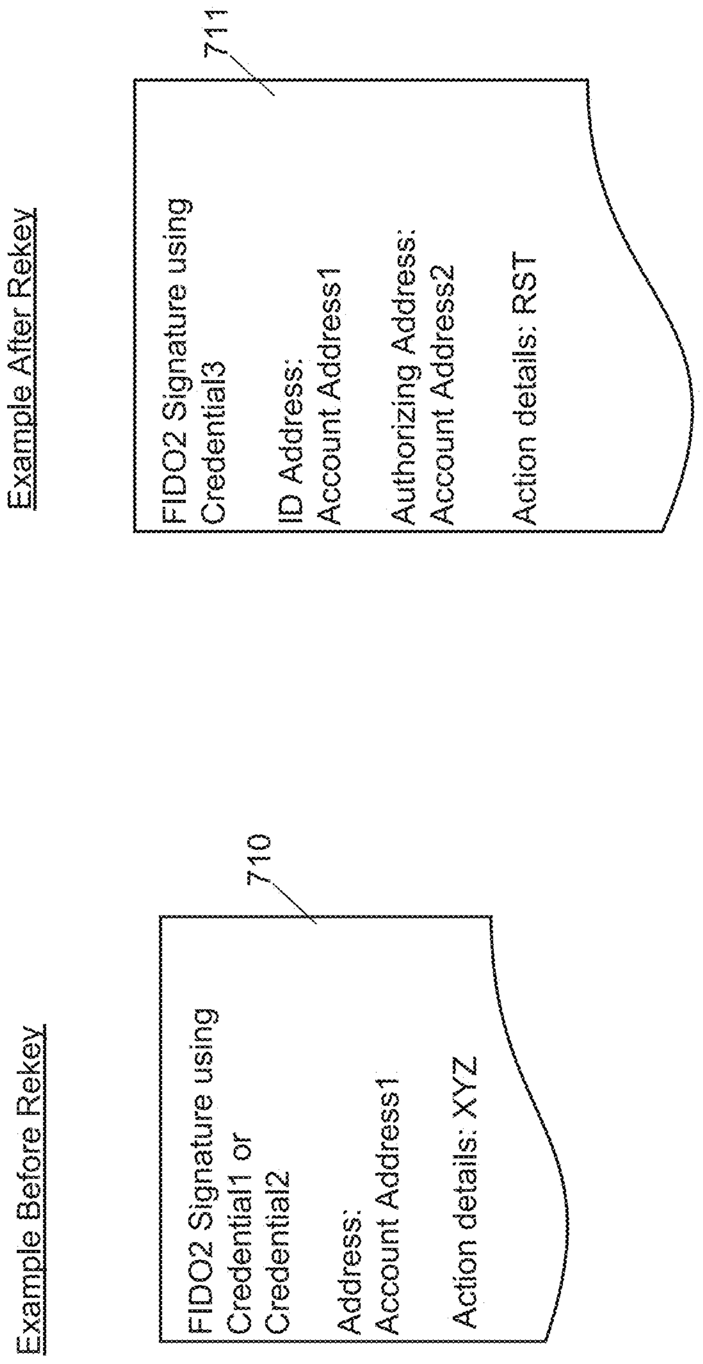
FIG. 7C are diagrams of a computed and authenticated action before rekeying and after rekeying, according to an example embodiment.

Turning to FIG. 7C, an example record 710 of an authenticated action XYZ is shown before rekeying using a credential of User Account1. A record that is stored on the blockchain includes Account Address1 and action details for action XYZ. Examples of actions include a signing a smart contract, providing authorization, executing a transaction, and other types of computational actions. A more detailed record, for example, also includes a FIDO2 signature computed using Credential1 or Credential2, that was used to authenticate the action XYZ. These credential details can be stored in the code script and attached to the detailed record for action XYZ, displayed via the GUI 300.

An example record 711 of an authenticated action RST is shown after rekeying of User Account1 using the credential of User Account2. A record stored on the blockchain includes Account Address2, which is the authorizing address of User Account2, and may include the action details for action RST. A more detailed record, for example, also includes a FIDO2 signature using Credential3. These credential details can be stored in the script and attached to the detailed record for action RST, displayed via the GUI 300.

In an example aspect, the above approach to rekeying advantageously allows a user to change their credential (or credentials) without having to migrate their digital assets on the blockchain to a new user account. In other words, instead of rekeying an existing user account, users would typically have migrates their digital assets stored on the blockchain to a new user account, and the new user account holds the new credentials. It is also herein recognized that the script could be modified to easily integrate with existing blockchain systems.

Figure 8A:
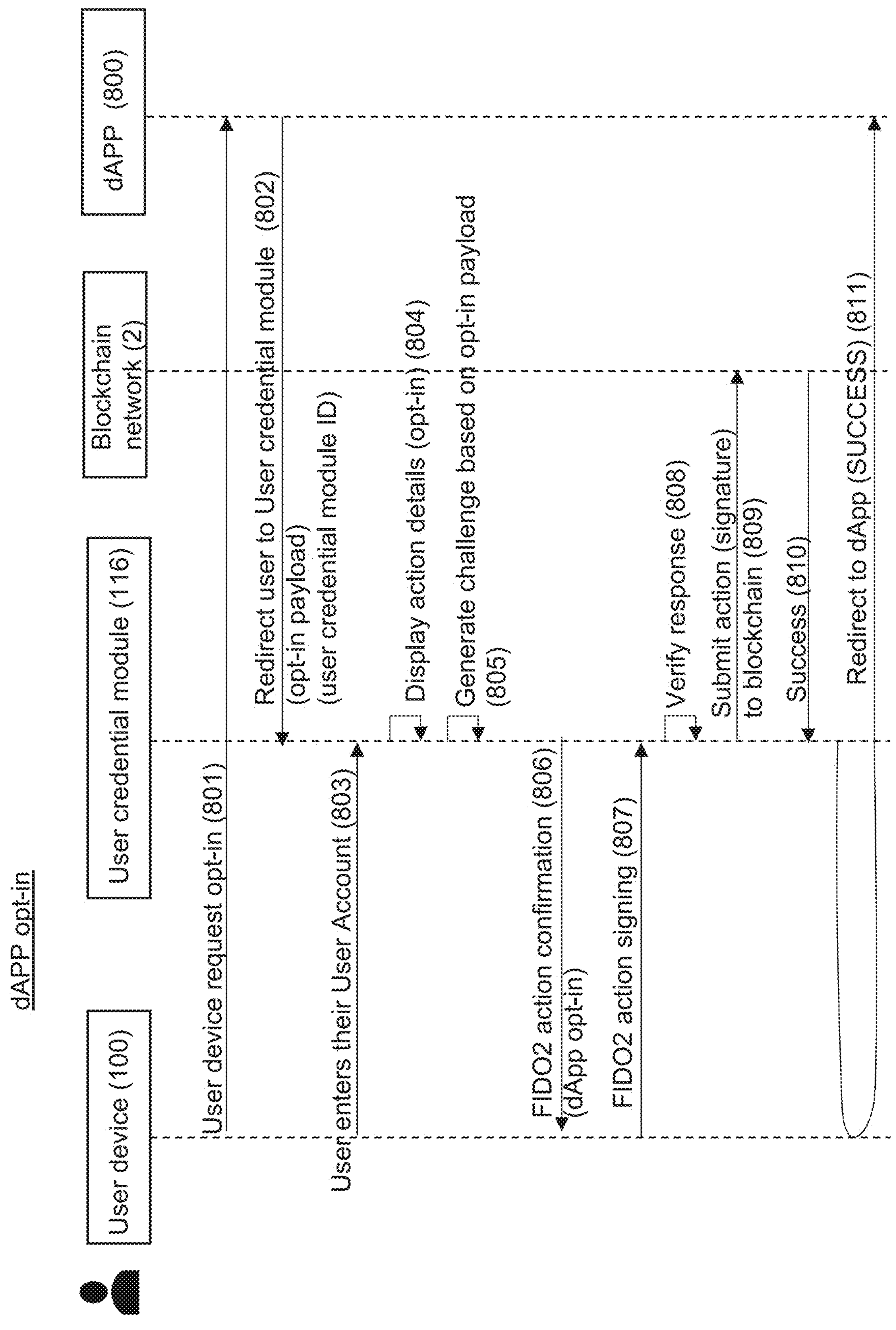
FIG. 8A is a flow diagram of computer executable instructions for a user device with a user account to opt-in to a distributed application (dApp), according to an example embodiment.
Figure 8B:
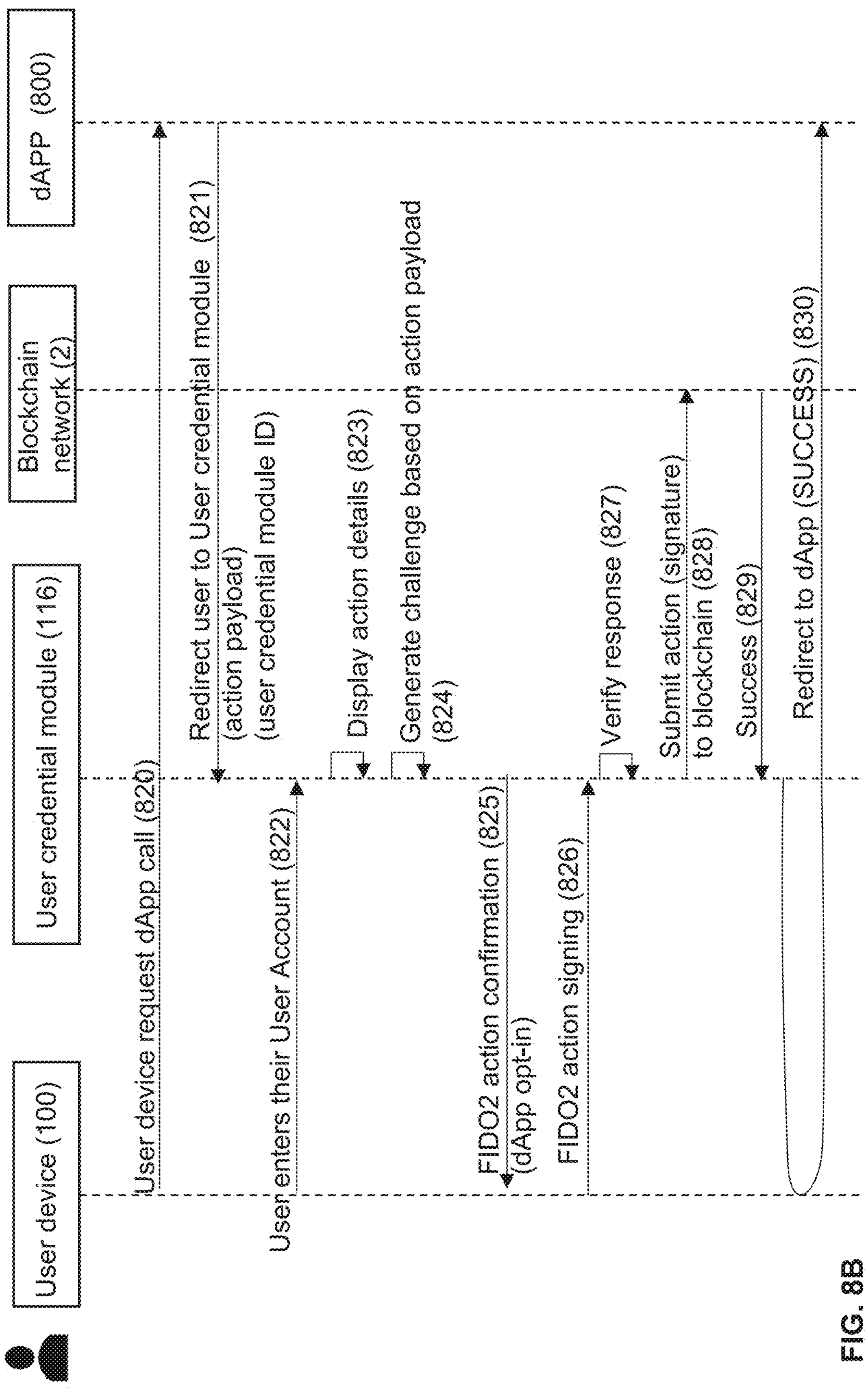
FIG. 8B is a flow diagram of computer executable instructions a dApp action authenticated by a user device, according to an example embodiment.

In an example aspect, another advantage of incorporating FIDO2 signature into the blockchain access is the ability to utilize a WebAuthn protocol to perform transaction confirmation directly on the blockchain. This allows all dApp transaction signing to work with standard web browsers without going through side channels (e.g., like third party protocols that connect blockchain wallets to dApps). Turning to FIGS. 8A and 8B respectively, example executable instructions are provided for dApp opt-in and an ongoing dApp transaction call using the FIDO2 signature.

Turning to FIG. 8A, the user device 100 transmits a user device request to opt-in to a given dApp 800 (801). In other words, the user, using their user account on the user credential module 116, wishes to join the given dApp. The dApp 800, for example, resides on the blockchain network of computer nodes 2.

In response to the request, the dApp 800 redirects the user device 100 to the user credential module 116 (802), which is hosted by data chain access server system 18. The redirect includes, for example, an opt-in payload and a user credential module ID. The opt-in payload includes data specifying an action that the dApp requests user permission (e.g., consent) for the dApp to attach and data to the user account on the blockchain for any future dApp interaction.

Responsive to the redirect, the user device 100 enters or accesses their user account in user credential module 116 (803). This access includes the GUI 300 being displayed at the user device 100. The user credential module 116, via the GUI 300, displays the opt-in details for the user to review (804). For example, these details are provided in the opt-in payload. The user credential module 116 generates a challenge based on the opt-in payload (805) and sends the challenge to the user device for FIDO2 action confirmation (806). The challenge includes, for example, the opt-in payload for the given dAPP 800, or information derived from the opt-in payload. In an example aspect of obtaining action confirmation, the GUI 300 displayed on the user device 100 prompts the user to authenticate the action for opt-in to the dApp.

The user and the user device 100 execute a FIDO2 action to sign the response to the challenge (807). For example, the user device 100 prompts the user for biometric authentication, such as to scan their face or scan their thumbprint. The response, which includes the challenge that has been digitally signed using the FIDO2 private key (or, more generally, the DA private key), is sent to the user credential module 116.

The user credential module 116 validates the digital signature of the response using the corresponding FIDO2 public key (or, more generally, the corresponding DA public key) associated with the user account (808). In an example aspect, the digital signature is a FIDO2 signature signed by the FIDO2 private key that is associated with the user account tracked by the user credential module 116.

The user credential module 116 initiates verification, for example, on the ID server system 111 or on the data chain access server system 18. This is done by using the corresponding FIDO2 public key of the user account to verify the FIDO2 signature.

If, or after, the digital signature of the response has been successfully verified by the user credential module 116, then the user credential module 116 submits the opt-in payload and the digital signature to the blockchain network 2 (809). The blockchain network 2 confirms the action to opt-in and updates the record of the user account on the blockchain 10. In an example aspect, one or more blockchain computer nodes in the blockchain network 2 executes the code script (or verification script) of the user account to verify the digital signature.

The user account on the blockchain is updated to store an opt-in record between the user account and the dApp. This opt-in record stored on the blockchain is used to facilitate future computational actions between the dApp and the user account.

The blockchain network 2 returns a message to the user credential module 116 that confirms the action for opt-in and the updates to the user account on the blockchain 10 (810).

The user credential module 116 then redirects the user device back to the dApp website with the action status details of the opt-in (811).

In an example aspect, the user credential module 116 records that the dApp is associated with a given blockchain user account. This association is stored for example, in the subset dApps module 303 and viewable using the GUI 300.

Turning to FIG. 8B, the dApp has been associated with the given blockchain user account, a dApp action can be executed using the FIDO2 authentication.

The user device 100 transmits a request dApp call (820) to the dApp 800. The dApp 800 redirects the user device to the user credential module (821). The redirect, for example, includes transmitting a dApp action payload to the user credential module 116. The dApp action payload includes data specifying an action that includes the user device (via their user account) making a call to one or more of the functions defined within the dApp.

Responsive to the redirect, the user device 100 enters or accesses their user account in user credential module 116 (822). This access includes the GUI 300 being displayed at the user device 100. The user credential module 116, via the GUI 300, displays the action details for the user to review (823), which are from the action payload. The user credential module 116 generates a challenge based on the action payload (824) and sends the challenge to the user device for FIDO2 action confirmation (825). The challenge includes, for example, the action payload or information derived from the action payload. In an example aspect of obtaining action confirmation, the GUI 300 displayed on the user device 100 prompts the user to authenticate the action.

The user and the user device 100 execute a FIDO2 action to sign the response to the challenge (826). For example, the user device 100 prompts the user for biometric authentication, such as to scan their face or scan their thumbprint. The response, which includes the challenge that has been digitally signed using the FIDO2 private key (or, more generally, the DA private key), is sent to the user credential module 116.

The user credential module 116 validates the digital signature of the response using the corresponding FIDO2 public key (or, more generally, the corresponding DA public key) associated with the user account (827). In an example aspect, the digital signature is a FIDO2 signature signed by the FIDO2 private key that is associated with the user account tracked by the user credential module 116.

If, or after, the digital signature of the response has been successfully verified by the user credential module 116, then the user credential module 116 submits the action payload and digital signature to the blockchain network 2 (828). The blockchain network 2 confirms the action and updates the record of the user account on the blockchain 10.

The blockchain network 2 returns a message to the user credential module 116 that confirms the action and the updates to the user account on the blockchain 10 (829).

The user credential module 116 then redirects the user device back to the dApp website with the action status details (830).

Using the above process, the user can user their user device to strongly authenticate dApp action on the blockchain, for example, using FIDO2 authentication.

Figure 9:
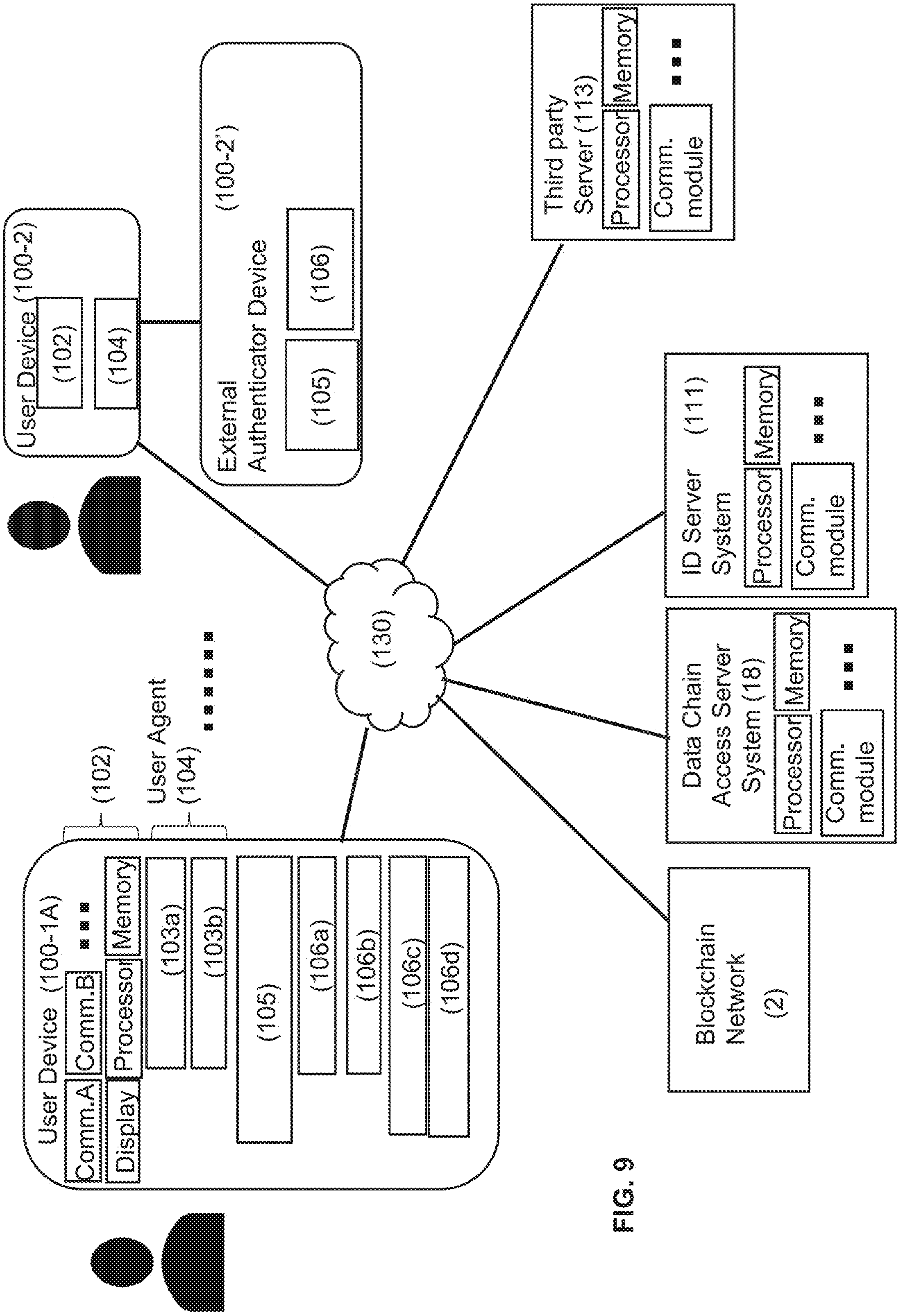
FIG. 9 is another schematic diagram of the computing system of devices connected to a data network, according to an example embodiment.

Turning to FIG. 9, another example of the system is shown that includes the server systems 111 and 18, the user devices, and the blockchain network of nodes 2 in data communication with each other over a data network 130, such as the Internet. It will be appreciated that server system 111 and 18 each comprises one or more server machines. In an example aspect, a server system includes a processor, memory and a communication module for connecting to the data network 130. In a further example aspect, a third party server 113 is also connected to the data network 130 to interact with one or more of the user device, the data chain access server system 18, the ID server system 111 and the blockchain network 2. For example, the third party server 113 is a relying party that wants access to a smart contract, or a digital signature, or a dApp. It will be appreciated that the memory on the servers store thereon, amongst other things, specific computer executable or processor implemented instructions and specific data, that when processed by the processor, implement the actions described herein.

Figure 10A:
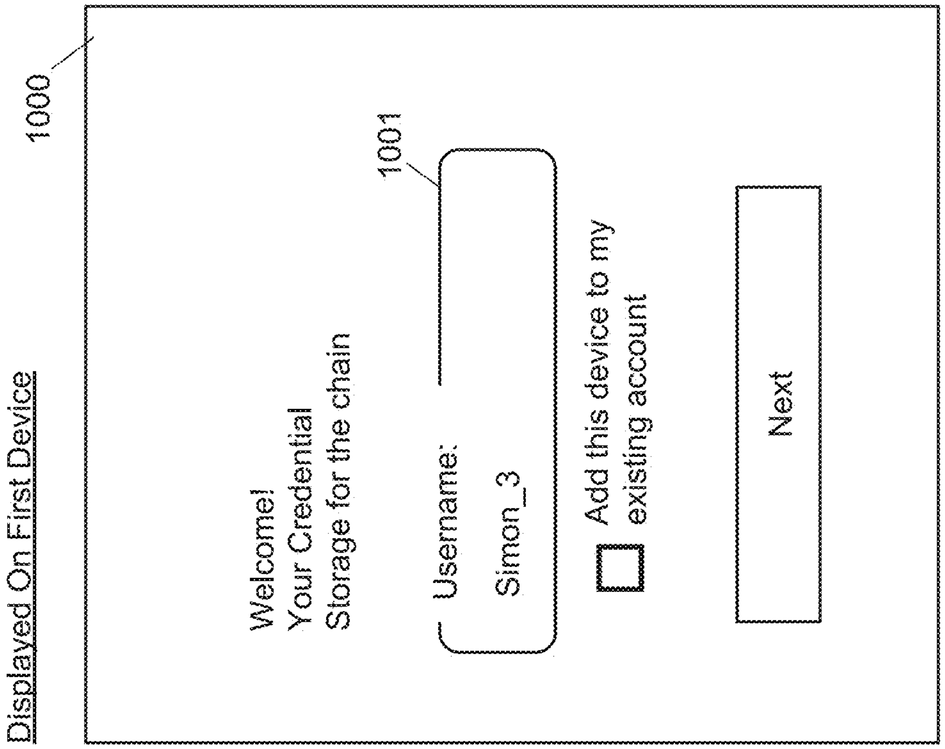
FIGS. 10A to 10R are graphical user interfaces (GUIs) of a user credential module that are displayable on a user device, according to an example embodiment.
Figure 10B:
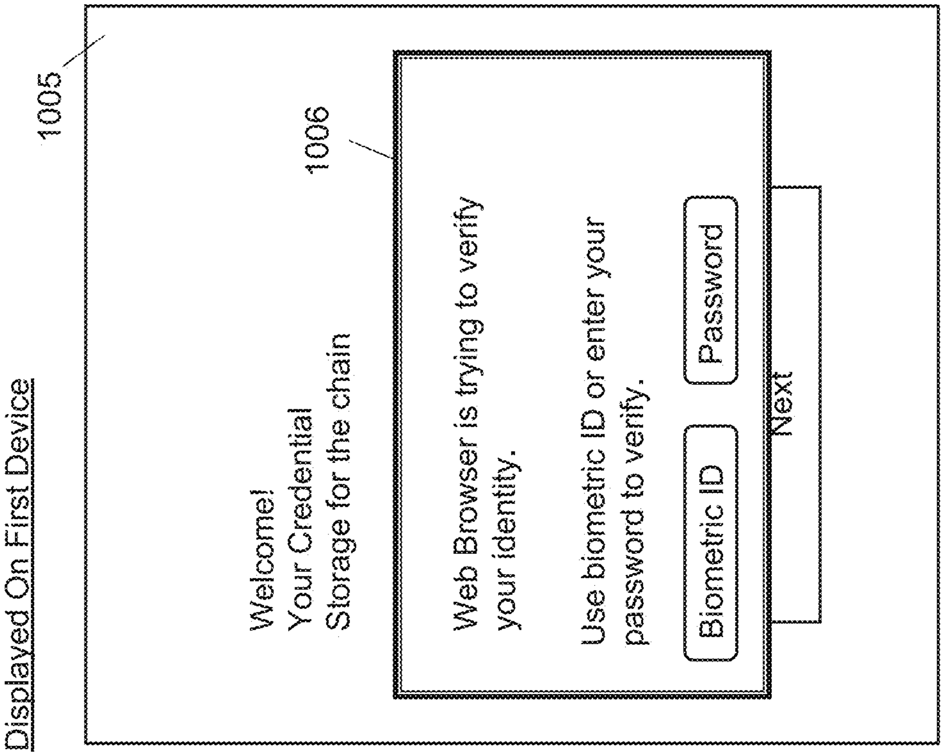
Figure 10C:
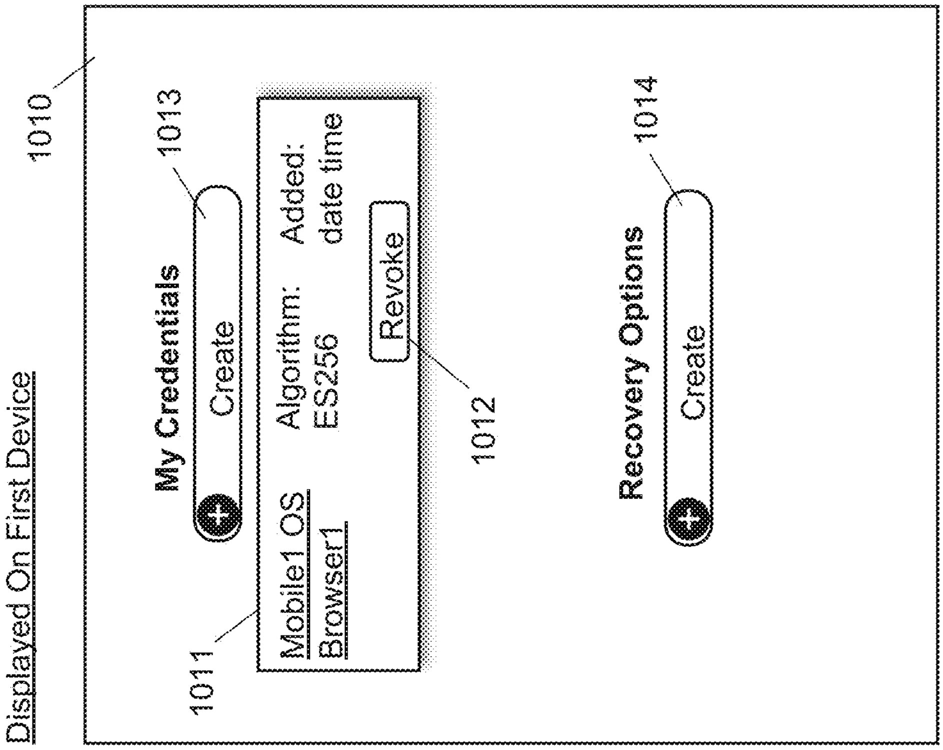
Figure 10D:
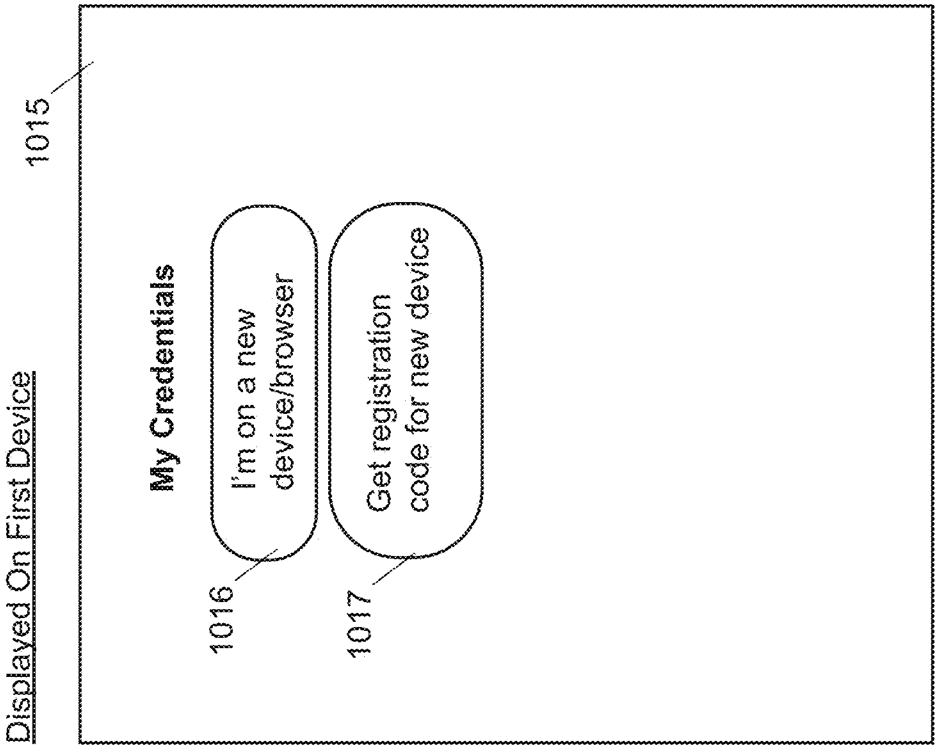
Figure 10E:
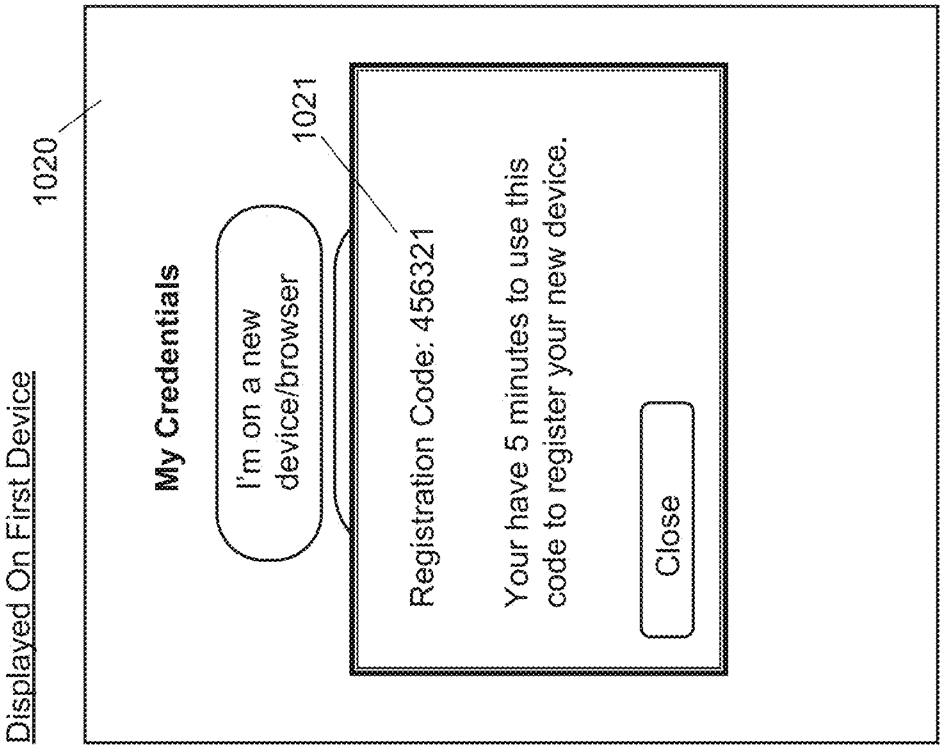
Figure 10F:
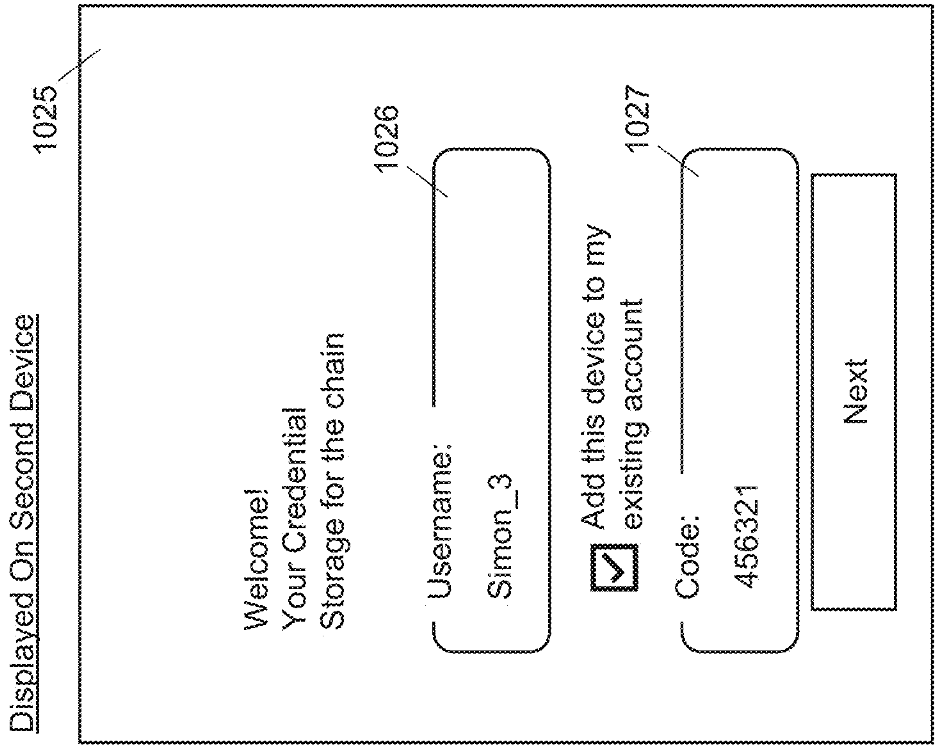
Figure 10G:
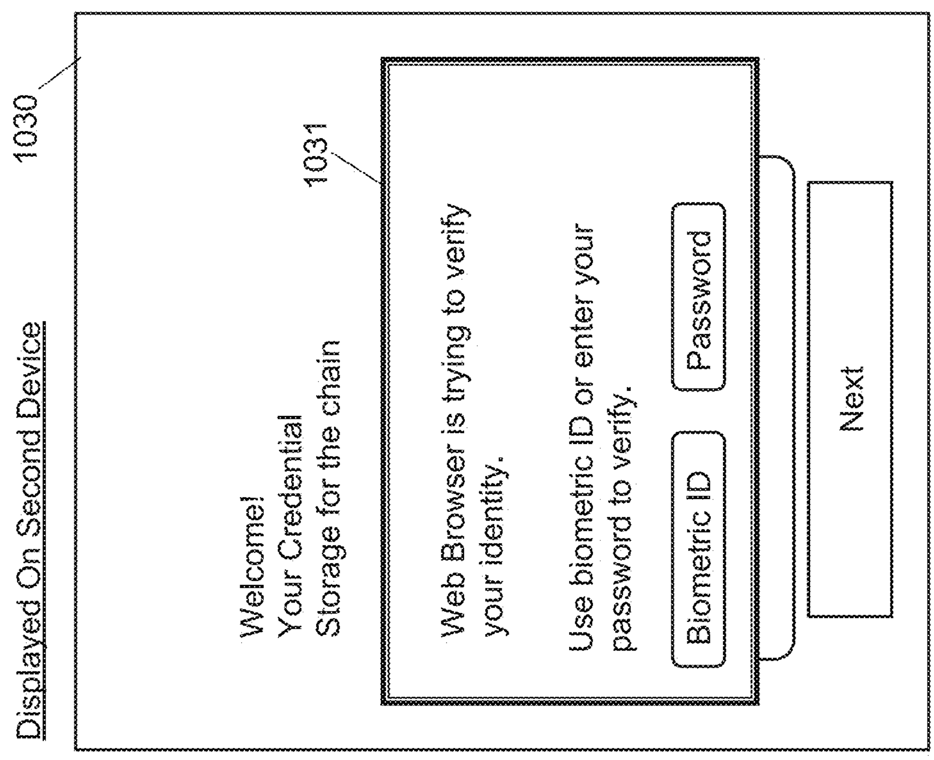
Figure 10H:
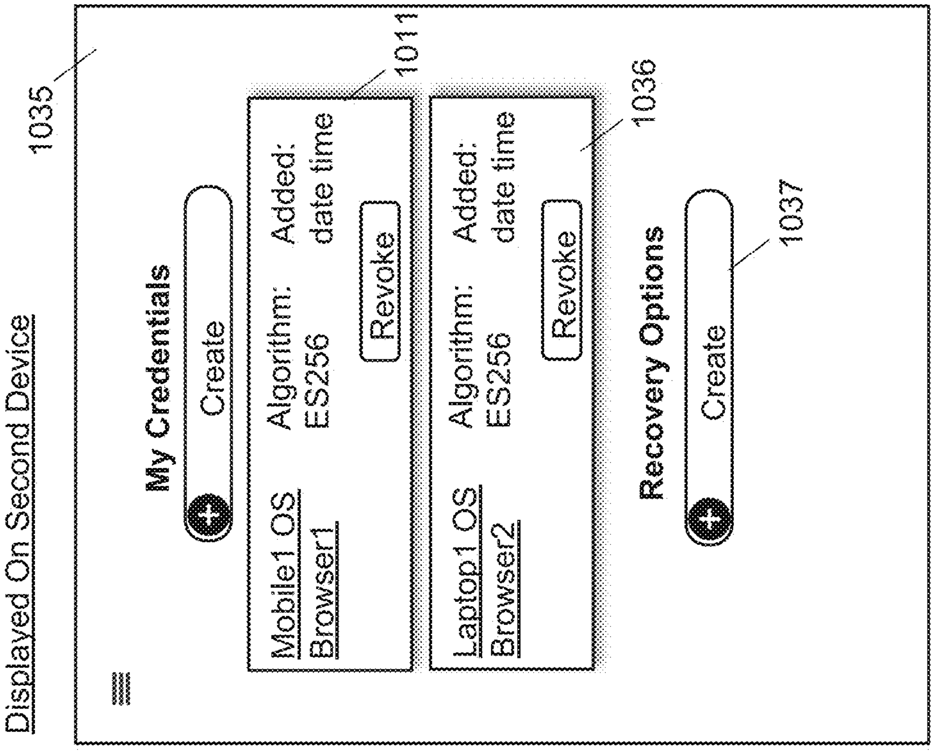
Figure 10I:
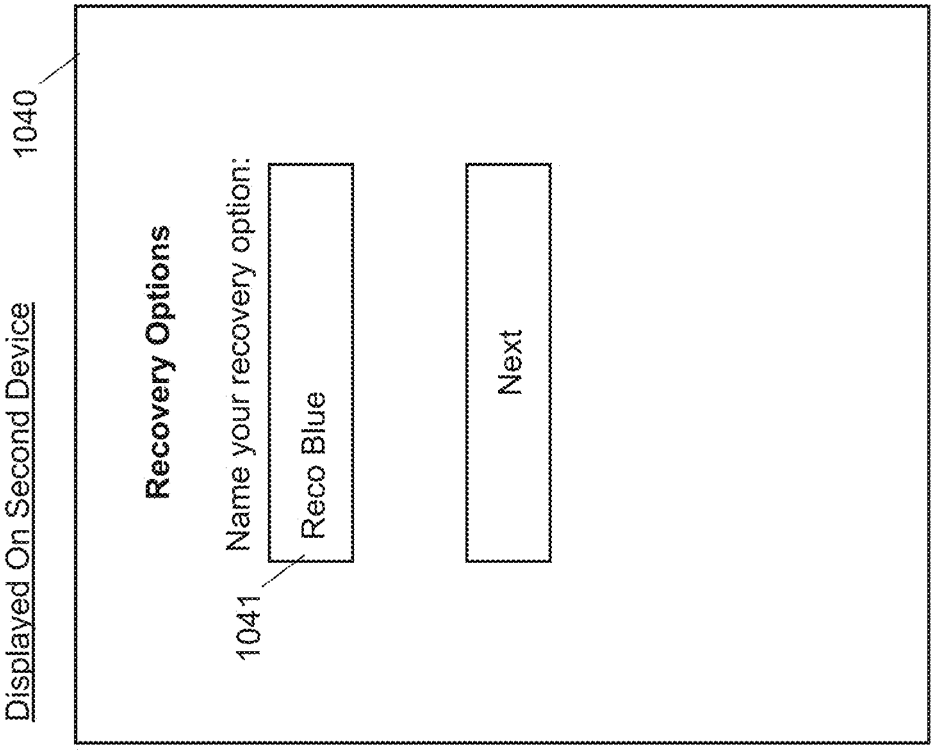
Figure 10J:
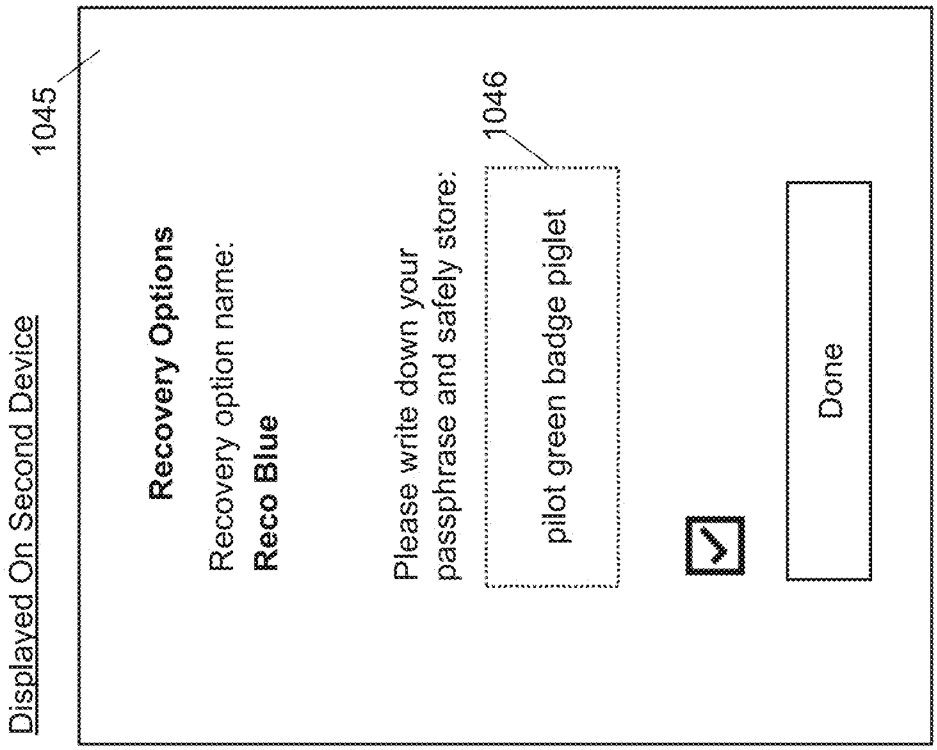
Figure 10K:
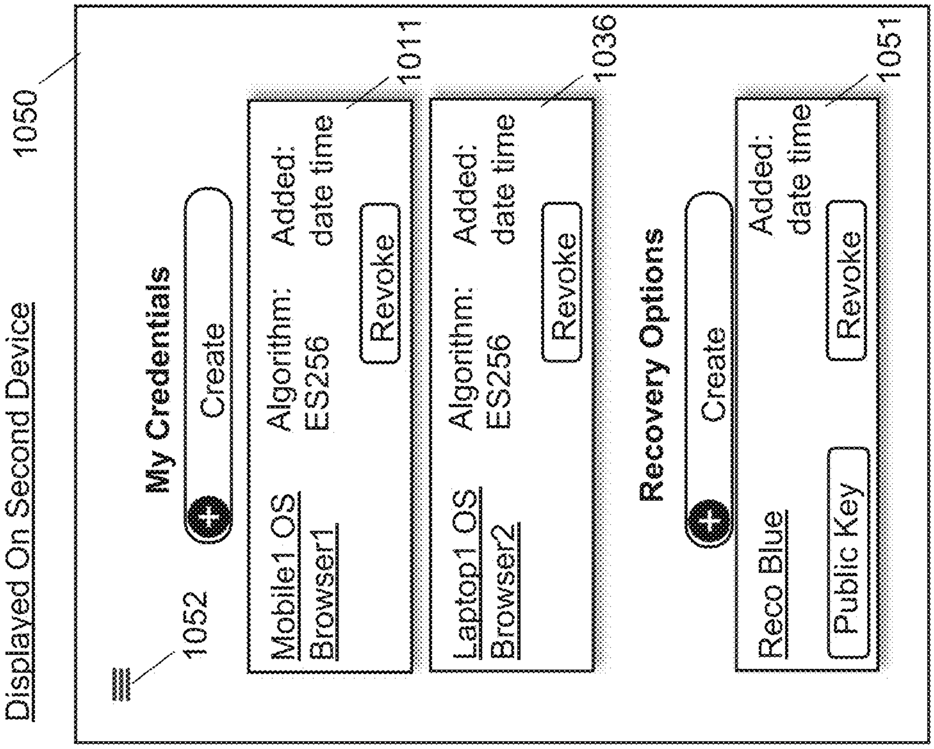
Figure 10L:
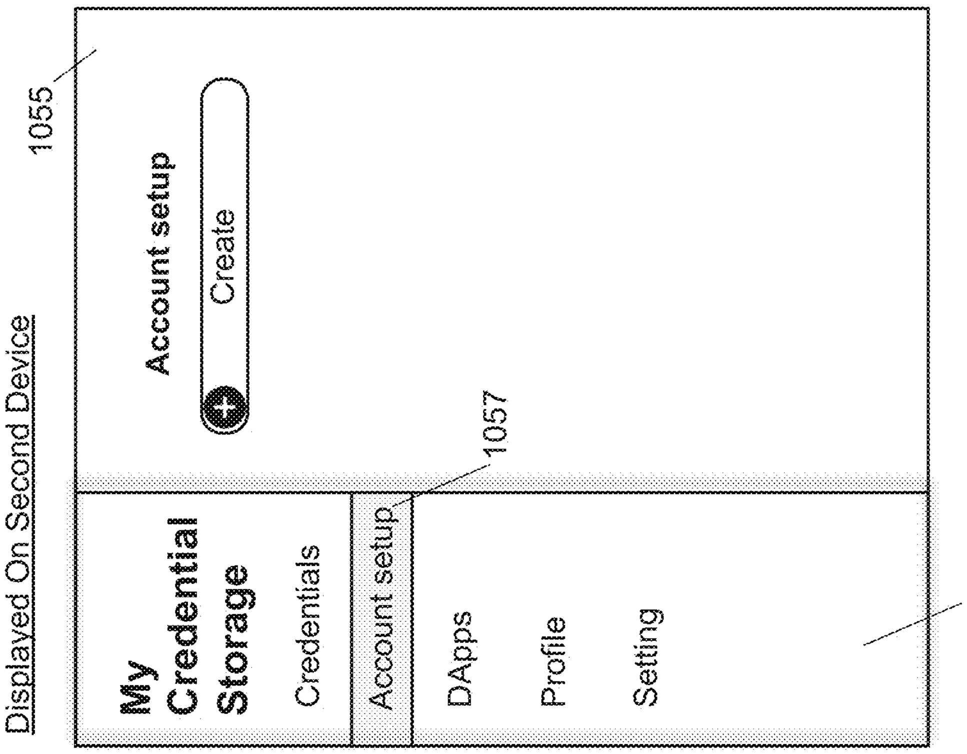
Figure 10M:
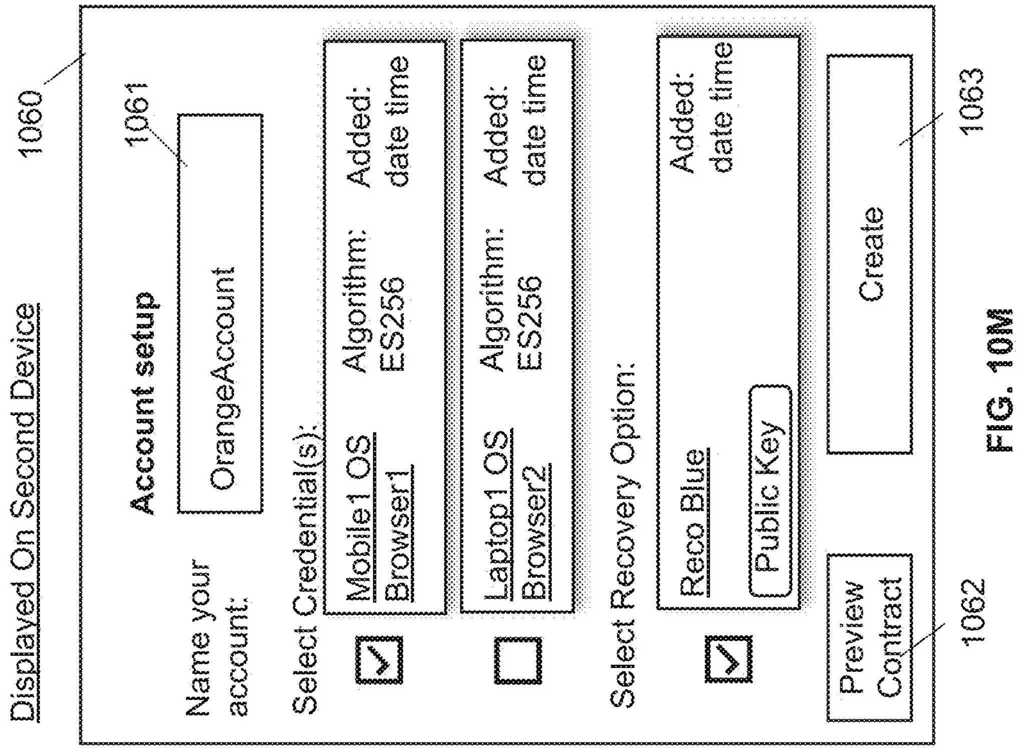
Figure 10N:
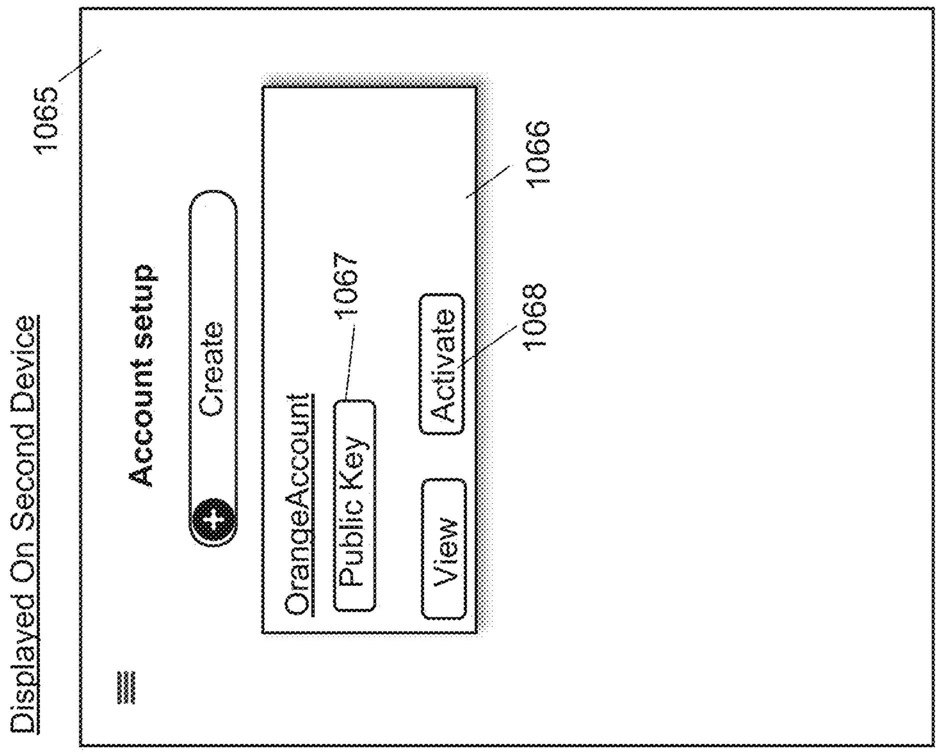
Figure 10O:
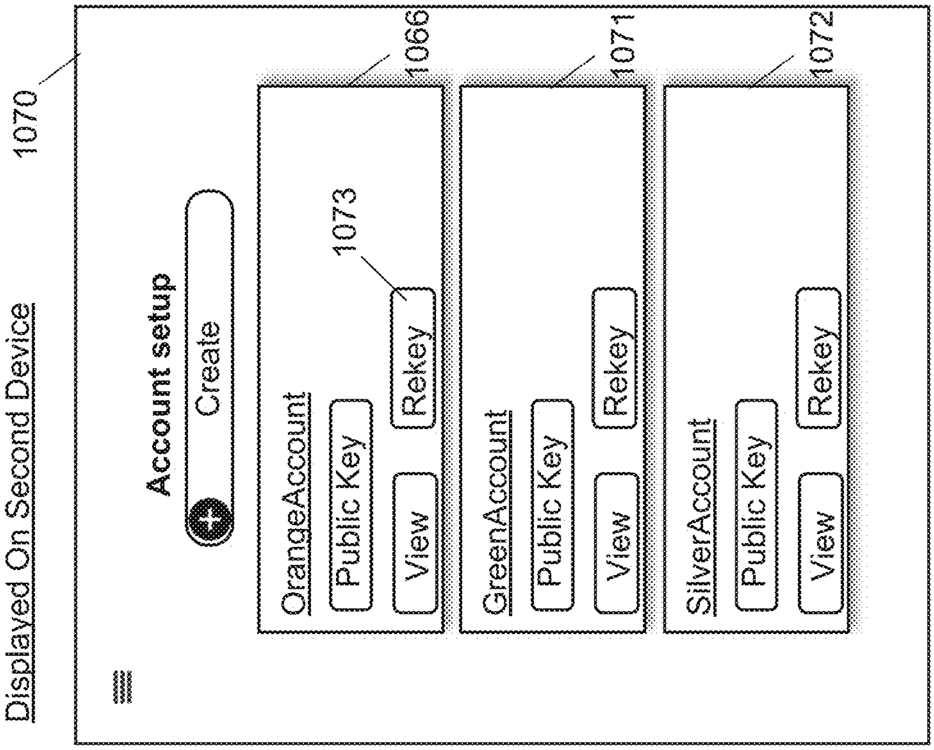
Figure 10P:
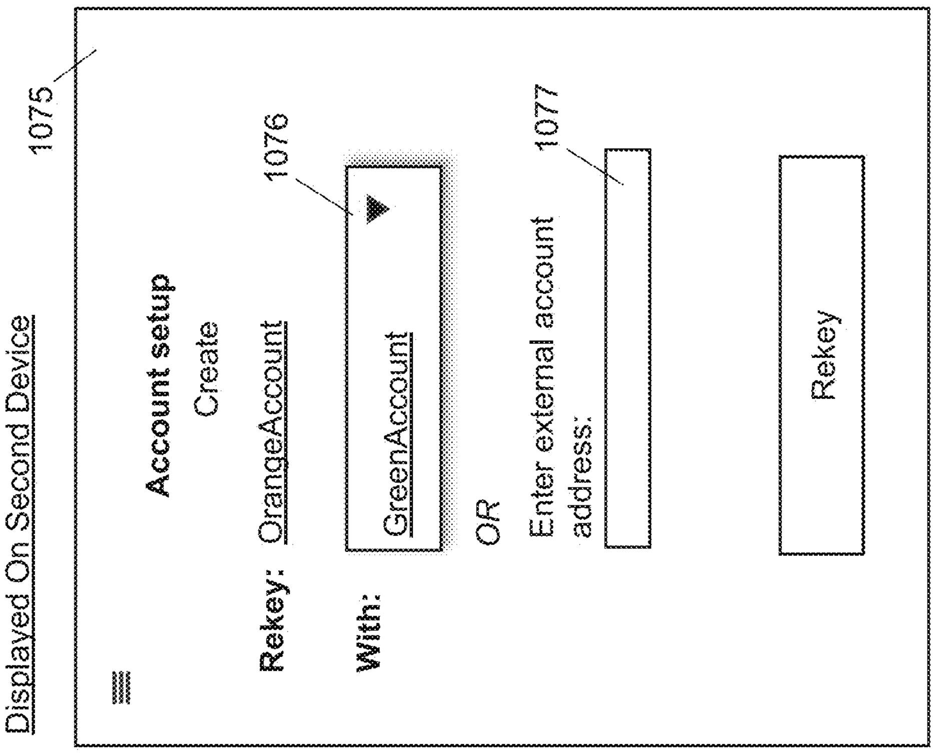
Figure 10R:
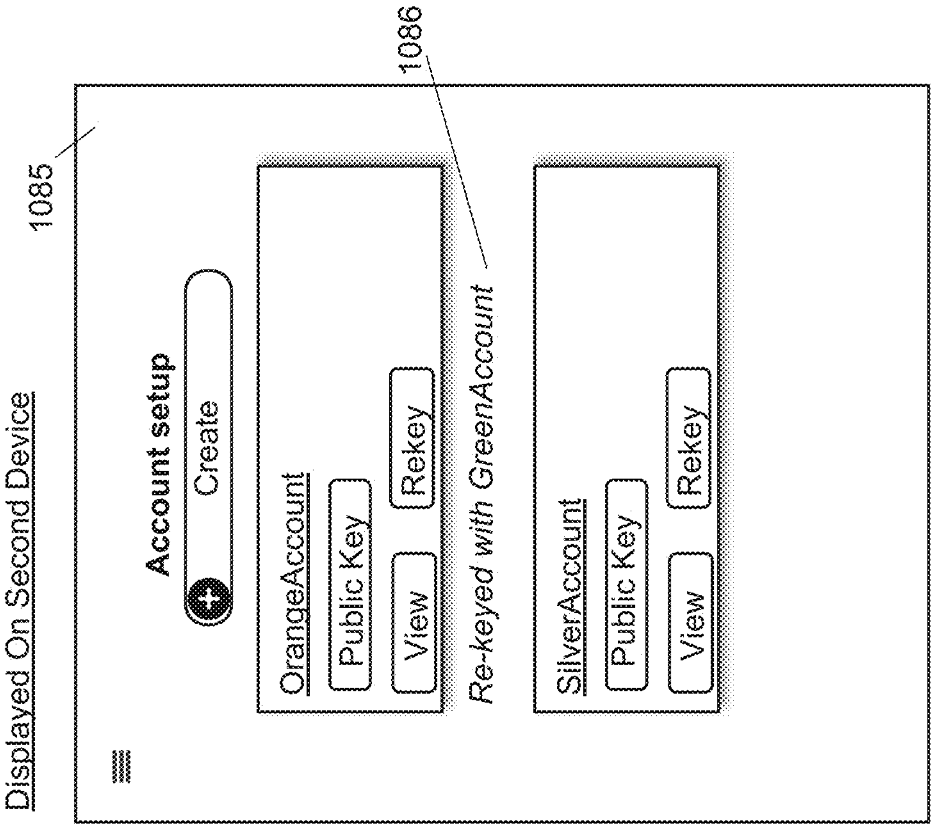

Example embodiments of screenshots of a GUI 300 are shown in the FIGS. 10A to 10R. The GUI is displayable on the display screen of a user device 100. The example GUI is displayable via a web browser or a native application. The GUI shows different screens depending on the input provided to the GUI. In other words, the different example screens, herein called GUI screens, that are shown in FIGS. 10A to 10R are part of the GUI 300.

Turning to FIG. 10A, a log-in screen 1000 is show where the user enters in their identifying information, such as their username or an email address, into an input field 1001. In the GUI screen 1005 in FIG. 10B, after the GUI receives the username or email address, the GUI displays a prompt 1006 for strong authentication, such as using a biometric identification (via a scanner 106 collecting biometric data of the user) or by password. For example, upon verification, a DA private key (or a FIDO2 private key in a FIDO2 embodiment) is created and stored on the user device is used to sign a challenge coming from the ID server system 111, and user device also creates the corresponding DA public key (or a FIDO2 public key in a FIDO2 embodiment). The user device transmits the FIDO2 public key and the attestation result (e.g., the signed challenge) to the ID server system 111. The ID server system 111 validates the attestation result and stores the user's DA public key. After the attestation result is validated by the ID server 111, the ID server 111 sends the DA public key to the data chain access server system 18 for storage in the database 20.

In this example embodiment, the user is using a mobile device with a given operating system (OS) (e.g., generically identified as Mobile1 OS) and is accessing the GUI 300 using a first given browser (e.g., generically identified as Browser1). The user credential module 116, for example, automatically obtains the type of user device OS and type of web browser. The user credential module automatically combines this device OS identifier, web browser identifier, and the DA public key to generate a credential for the user. As such, in the GUI screen 1010 in FIG. 10C, the GUI shows a newly created credential 1011, in this example, named "Mobile1 OS Browser1". The credential, for example, is also associated with date and time stamp of the credential's addition to the user credential module. In another example aspect, the credential also includes the type of algorithm used to generate the digital signature (or, in a specific example embodiment, a FIDO2 signature). In the example shown, an EC256 algorithm is used, which is a type of elliptic curve digital signature. Another type that could be used is a RSA signature. The GUI also includes a GUI control 1012 to revoke the credential. Also shown in FIG. 10C is a GUI control 1013 to create another credential and a GUI control 1014 to create a recovery option. In this example series, the user selects the control 1013 to create another credential, which then causes the GUI to show the controls in the GUI screen 1015 in FIG. 10D. It will be appreciated that a user selection in the GUI is also considered a form of input into the GUI.

Turning to FIG. 10D, the GUI shows a first control 1016 to specify that the user is currently on a new device or a new web browser. The GUI also shows a second control 1017 to specify that the user credential module 116 should provide a registration code for a new device. This code can be entered on the new device. As noted above, a credential is a unique combination of a device identifier and a DA public key, and in some cases a web browser. In this example, the user selects the second control 1017 to get the registration code, which displays the GUI screen 1020 shown in FIG. 10E. Turning to FIG. 10E, the GUI displays the registration code 1021. The GUI also starts a timer of a defined time period for the user to enter the code using their new device to create a new credential. In this example, the registration code is 456231 and the user credential module 116 defines a time period of five minutes to use the given code.

The user then uses their different user device (e.g., a second device) to access the GUI website of the user credential module 116. In an example embodiment, the GUI website is provided by the data access server system 18. For example, the second device is a laptop computer. As shown in FIG. 10F, the user has now switched to a different user device compared to the first user device used to show FIGS. 10A to 10E.

In FIG. 10F, on their second user device (e.g., the laptop), the GUI shows a GUI screen 1025 that includes an entry field for the username 1026 for logging in to the user credential module. The GUI also displays an entry field for receiving the registration code 1027. In this example, the user re-enters their same username and inputs the registration code 456321. This is done within the time period (e.g., 5 minutes or some other defined time period) since the registration code was issued. Otherwise, verification of the code fails.

In the GUI screen 1030 in FIG. 10G, after the GUI receives the username or email address, the GUI displays a prompt 1031 for strong authentication, such as using a biometric identification (via a scanner 106 collecting biometric data of the user) or by password. The user credential module also verifies that the registration code and the username match its own records. If verification of the registration code is successful, and if verification of the biometric identification is successful, the creation of a new credential is repeated on the second user device. In other words, a new DA private key and DA public key pair are created on the second user device. The DA private key on the second user device is stored on the device authenticator of the second user device, and the corresponding DA public key is sent to the ID server system 111 and the user credential module 116.

Turning to FIG. 10H, in the GUI screen 1035, the new credential 1036 on the second user device, which is a laptop computer in this example, is created and displayed. The credential is displayed as "Laptop1 OS Browser2", and it includes the date and time that the credential was added to the user credential module. It also includes the algorithm used for the digital signature and a control to revoke the credential.

FIG. 10H also shows a GUI control 1037 for creating a recovery option, and responsive to detecting the user selecting this control, the GUI shows the screenshot of FIG. 10I.

It will be appreciated that the GUI screens shown in FIGS. 10I to 10R are shown on the second device to continue the user experience. However, these same GUI screens can also be shown on the first device, more particularly, by using the first device to access the GUI 300 provided by the data access server 18. In other words, the user can use the first device to display the same screens, which would include the addition of the credential associated with the second device called "Laptop1 OS Browser 2".

In the GUI screen 1040, the GUI displays a text entry field 1041 to receive a name of the recovery option as per FIG. 10I. Then, in the GUI screen 1045 of FIG. 10J, the GUI shows the recovery option name, and a private key 1046 in the form of a passphrase, or some other text or alphanumeric code. This passphrase, for example, is only shown once to the user. A corresponding public key for the recovery option is stored at the user credential module 116.

The GUI screen 1050 in FIG. 10K shows the list of two created credentials 1011, 1036 and a recovery option 1051. The recovery option displayed in the GUI includes the name, the date and time that the recovery option was added to the user credential module, the public key, and an associated control to revoke the recovery option.

In this example, the user then proceeds to account setup by accessing a menu option as shown in FIG. 10L. For example, a menu control button 1052 in the upper corner shown in FIG. 10K, after being selected, will display a menu. In the GUI screen 1055, the menu 1056 includes controls for accessing: Credentials, Account Setup, DApps, Profile and Setting. The GUI in FIG. 10L also shows a GUI control 1057 to create a new user account. Responsive to detecting that the control to create the new user account has been selected (e.g., an input is received by the GUI), the GUI displays a text entry field 1061 to receive the name of the new user account, as per FIG. 10M. For example, the new user account is called "OrangeAccount".

In the GUI screen 1060 in FIG. 10M, there are also options to select one or more of the credentials to associate with the user account called "OrangeAccount". In this example, the user selects "Mobile1 OS Browser1" as the credential associated with the OrangeAccount. The GUI also shows the option to selects a recovery option. It will be appreciated that multiple credentials and multiple recovery options can be associated with an account, as selected by the user.

The GUI in FIG. 10M also includes a control 1062 to preview a smart contract, which evidences the new user account. The preview of the contract shows a portion of the verification script associated with the account being created. For example, the constants or arguments, or both, of the verification script (also called a code script) are shown. In another example aspect, the preview of the contract includes the address of the user account (e.g., a hash value of the verification script).

After the user is satisfied with their selected credential(s) and recovery option(s), they select a control 1063 that initiates creating the account.

FIG. 10N shows the GU screen 1065 that includes details and controls associated with the newly created OrangeAccount 1066. It includes, for example, the public key associated with the recovery option 1067. Optionally, it can include an activate control 1068, which initiates an additional computational action to activate the account. Alternatively, the new user account is automatically activated after it is created.

Multiple user accounts can be created. For example, in the GUI screen 1070 in FIG. 10O, the user has created the user accounts named as "OrangeAccount" 1066, "GreenAccount" 1071, and "SilverAccount" 1072. In an example embodiment, each user account is displayed in association with a rekey control. In this example, after detecting that the user has selected the rekey control 1073 associated with the OrangeAccount, the GUI shows the screenshot of FIG. 10P.

Turning to FIG. 10P, the GUI screen 1075 displays controls for rekeying the OrangeAccount. The controls include an option 1076 for selecting another user account (e.g., the GreenAccount or the SilverAccount), and an option 1077 to enter in an external user account address. In this example, the user has selected to rekey the OrangeAccount with the GreenAccount. In other words, after rekeying, the credentials of the GreenAccount are used to authenticate actions associated with the OrangeAccount. In an example embodiment, the option 1076 is displayed as a dropdown list, but other GUI mechanisms for displaying and selecting an option can be used.

Figure 10Q:
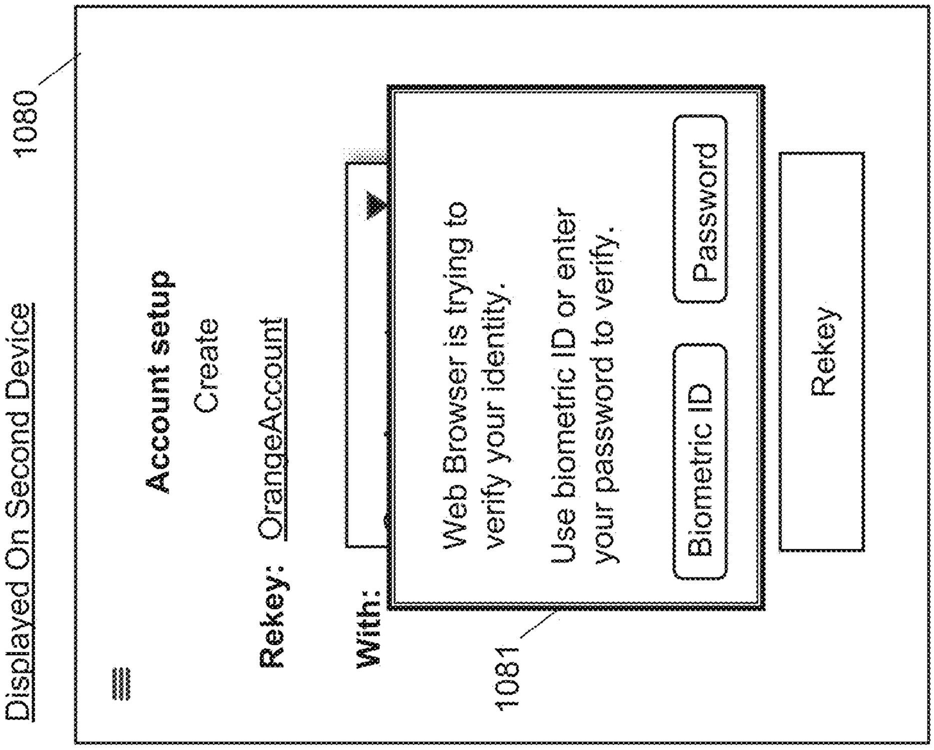

To confirm the rekeying, the GUI displays a prompt 1081 for user identity confirmation using biometric ID verification or password verification, as per GUI screen 1080 in FIG. 10Q.

Turning to FIG. 10R, after the rekeying, the GUI screen 1085 then shows an indicator 1086 that the OrangeAccount has been rekeyed with the GreenAccount.

It will be appreciated that the features described herein are described with respect to accessing, storing, and transacting data on blockchain data networks. However, these same features can be applied to accessing, storing, and transacting data on other types of data systems, not limited to blockchain data networks.

Below are general example embodiments.

In an example embodiment, a data access server system comprises:

- a communication module, a processing system, and a memory;

the memory storing thereon at least a database and a user credential module of executable instructions;

the processor configured to obtain from the memory and execute the executable instructions, which comprise: providing a graphical user interface (GUI) configured to be displayed by a user device operable to connect to the data access server system; receiving an input via the GUI to create a credential that is associated with, or comprises, at least a device authenticator public key and a device ID of the user device, wherein a device authenticator private key corresponding to the device authenticator public key is stored on the user device; receiving another input via the GUI to create a user account that comprises the credential; automatically generating a code script for verifying the user account, the code script comprising the device authenticator public key; and automatically generating a user account address of the user account using the code script.

In an example aspect, the executable instructions further comprise inputting the code script into a hash function to obtain a hash result, and wherein the hash result is the user account address.

In an example aspect, the credential is stored in the database in association with the user account address.

In an example aspect, the credential further associated with, or further comprising, a web browser identifier of a web browser that is stored and operable on the user device, and that is associated with the device authenticator public key.

In an example aspect, the executable instructions further comprise adding a second credential to the user account, the second credential comprising a second device authenticator public key and at least one of the device ID or a second device ID; and the code script for verifying the user account comprises the second device authenticator public key.

In an example aspect, the code script comprises a first condition to verify the credential using the device authenticator public key and, if the first condition results in a failed verification of the credential, then executing a second condition to verify the second credential using the second device authenticator public key.

In an example aspect, the device authenticator public key and the device authenticator private key are respectively a FIDO2 public key and a FIDO2 private key.

In an example aspect, the data access server system is in data communication with a blockchain network of computer nodes, and the executable instructions further comprise: responsive to detecting a requested action to be made on the blockchain network of computer nodes using the user account address, automatically executing the code script.

In an example aspect, the device authenticator public key and the device authenticator private key are respectively a FIDO2 public key and a FIDO2 private key; and wherein the credential is used to cryptographically sign the requested action, which produces a FIDO2 digital signature associated with the requested action, and a record of the requested action is verifiable on the blockchain network of computer nodes using the FIDO2 digital signature.

In an example aspect, the memory stores thereon a code script template that is used to generate the code script, the code script template comprising: a first constant for the device authenticator public key and a second constant for a recovery public key, wherein the recovery public key is associated with recovering the user account; a first function for verifying the device authenticator public key and a second function for verifying the recovery public key; and a set of logic functions that comprises first executing the first function and, if the first function fails, then executing the second function.

In an example aspect, a recovery private key corresponds to the recovery public key, and the GUI displays the recovery private key to the user.

In an example aspect, the data access server system further stores thereon a second user account associated with a same user as the user account, and the second user account comprises a second user account address and a second credential; and wherein, in response to a command to rekey the user account, the processor generates a rekeying mapping that the user account is associated with the second account address and the second credential.

In an example aspect, the GUI displays the user account in association with at least one of the second account address and the second credential.

In another example embodiment, a data access server system comprises:

a communication module, a processing system, and a memory;

the memory storing thereon at least a database and a user credential module of executable instructions;

the processor configured to obtain from the memory and execute the executable instructions, which comprise: providing a graphical user interface (GUI) configured to be displayed by a first user device operable to connect to the data access server system; receiving an input via the GUI to create a first credential that is associated with, or comprises, at least a first device authenticator public key, a first device ID of the first user device, and a first web browser identifier of a first web browser that is stored and operable on the first user device and that is associated with the first device authenticator public key, wherein a first device authenticator private key corresponding to the first device authenticator public key is stored on the first user device; receiving another input via the GUI to create a user account that comprises the first credential; automatically generating a code script for verifying the user account, the code script comprising the first device authenticator public key; and automatically generating a user account address of the user account using the code script; adding a second credential to the user account using the GUI, the second credential associated with, or comprises, at least a second device authenticator public key and at least one of the first device ID or a second device ID; and automatically generating an updated code script for verifying the user account, the updated code script comprising a first condition to verify the first credential using the first device authenticator public key and, if the first condition results in a failed verification of the first credential, then executing a second condition to verify the second credential using the second device authenticator public key.

In an example aspect, the second device ID corresponds to a second user device; and the second credential is associated with, or comprises, a second user device, and is further associated with at least the second device authenticator public key and the second device ID of the second user device.

In an example aspect, the second credential is associated with a first user device, and is further associated with, or comprises, the second device authenticator public key, the first device ID, and a second web browser identifier of a second web browser that is stored and operable on the first user device and that is associated with the second device authenticator public key.

In an example aspect, the memory stores thereon a code script template that is used to generate the updated code script, the code script template comprising: a first constant for the first device authenticator public key and a second constant for the second device authenticator public key; and a set of logic functions that comprises first executing a first function for verifying the first device authenticator public key and, if the first function fails, then executing a second function for verifying the second device authenticator public key.

In an example aspect, the memory stores thereon a code script template that is used to generate the updated code script, the code script template comprising: a first constant for the first device authenticator public key, a second constant for the second device authenticator public key, and a third constant for a recovery public key; and a set of logic functions that comprises first executing a first function for verifying the first device authenticator public key, and, if the first function fails, then executing a second function for verifying the second device authenticator public key, and, if the second function fails, then executed a third function for verifying the recovery public key; wherein a recovery private key corresponds to the recovery public key, and the GUI displays the recovery private key to the user at least once.

In another example embodiment, a data access server system, comprises:

a communication module, a processing system, and a memory;

the memory storing thereon at least a database and a user credential module of executable instructions;

the communication module in data communication with at least a blockchain network of nodes;

the processor configured to obtain from the memory and execute the executable instructions, which comprise:

providing a graphical user interface (GUI) configured to be displayed by a user device to connect to the data access server system;

receiving an input via the GUI to create a credential that is associated with, or comprises, at least a device authenticator FIDO2 public key, a device ID of the user device and a web browser identifier of a web browser that is stored and operable on the user device, wherein a device authenticator FIDO2 private key corresponding to the device authenticator FIDO2 public key is stored on the user device;

receiving another input via the GUI to create a blockchain user account that comprises the credential, the blockchain user account operable to execute an action on the blockchain network of nodes;

automatically generating a code script for verifying the blockchain user account, the code script comprising the device authenticator FIDO2 public key;

automatically generating a user account address of the blockchain user account using the code script; and responsive to detecting a requested action to be made on the blockchain network of computer nodes using the user account address, automatically executing the code script; and wherein the credential is used to cryptographically sign the requested action, which produces a FIDO2 digital signature associated with the requested action, and a record of the requested action is verifiable on the blockchain network of computer nodes using the FIDO2 digital signature.

It will be appreciated that any module or component exemplified herein that executes instructions may include or otherwise have access to non-transitory computer readable media such as storage media, computer storage media, or data storage devices (removable and/or non-removable) such as, for example, memory chips, magnetic disks, optical disks. Computer storage media may include volatile and non-volatile, removable and non-removable media implemented in any method or technology for storage of information, such as computer readable instructions, code, processor executable instructions, data structures, program modules, or other data. Examples of computer storage media include random access memory (RAM), dynamic random access memory (DRAM), static random access memory (SRAM), read-only memory (ROM), solid-state ROM, electrically erasable programmable read-only memory (EEPROM), flash memory or other memory technology, or any other medium which can be used to store the desired information and which can be accessed by an application, module, or both. Any such computer storage media may be part of the servers or computing devices, or accessible or connectable thereto. Any application or module herein described may be implemented using computer readable/executable instructions that may be stored or otherwise held by such computer readable media.

It will be appreciated that different features of the example embodiments of the system and methods, as described herein, may be combined with each other in different ways. In other words, different devices, modules, operations, functionality and components may be used together according to other example embodiments, although not specifically stated.

The steps or operations in the flow diagrams described herein are just for example. There may be many variations to these steps or operations according to the principles described herein. For instance, the steps may be performed in a differing order, or steps may be added, deleted, or modified.

The elements and screenshots of the GUIs shown herein are just for example. There may be many variations to these GUI elements or operations according to the principles described herein. For instance, the GUI elements and operations may be performed in a differing order, or GUI elements or operations may be added, deleted, or modified.

It will also be appreciated that the examples and corresponding system diagrams used herein are for illustrative purposes only. Different configurations and terminology can be used without departing from the principles expressed herein. For instance, components and modules can be added, deleted, modified, or arranged with differing connections without departing from these principles.

Although the above has been described with reference to certain specific embodiments, various modifications thereof will be apparent to those skilled in the art without departing from the scope of the claims appended hereto.

The invention claimed is:

1. A data access server system, comprising:

a communication module, at least one processor, and a memory;

the memory storing thereon at least executable instructions;

the communication module in data communication with at least a blockchain network of nodes;

the at least one processor configured to obtain execute the executable instructions, which comprise:

providing a graphical user interface (GUI) configured to be displayed by a user device operable to connect to the data access server system;

receiving an input via the GUI to create a credential that is associated with at least a device authenticator Fast Identity Online 2 (FIDO2) public key, a device ID of the user device and a web browser identifier of a web browser that is stored and operable on the user device, wherein a device authenticator FIDO2 private key corresponding to the device authenticator FIDO2 public key is stored on the user device;

receiving another input via the GUI to create a blockchain user account that comprises the credential, the blockchain user account operable to execute an action on the blockchain network of nodes;

automatically generating a code script for verifying the blockchain user account, the code script comprising the device authenticator FIDO2 public key;

automatically generating a user account address of the blockchain user account using the code script; and responsive to detecting a requested action to be made on the blockchain network of computer nodes using the user account address, executing the code script; and wherein the credential is used to cryptographically sign the requested action, which produces a FIDO2 digital signature associated with the requested action.

2. The data access server system of claim 1, wherein a record of the requested action is verifiable on the blockchain network of computer nodes using the FIDO2 digital signature.

3. The data access server system of claim 1, wherein the executable instructions further comprise inputting the code script into a hash function to obtain a hash result, and wherein the hash result is the user account address.

4. The data access server system of claim 1, further comprising a database, and wherein the credential is stored in the database in association with the user account address.

5. The data access server system of claim 1, wherein the executable instructions further comprise adding a second credential to the blockchain user account, the second credential comprising a second device authenticator public key and at least one of the device ID or a second device ID; and the code script for verifying the blockchain user account comprises the second device authenticator public key.

6. The data access server system of claim 5, wherein the code script comprises a first condition to verify the credential using the device authenticator public key and, if the first condition results in a failed verification of the credential, then executing a second condition to verify the second credential using the second device authenticator public key.

7. The data access server system of claim 1, wherein the memory stores thereon a code script template that is used to generate the code script, the code script template comprising:

a first constant for the device authenticator FIDO2 public key and a second constant for a recovery public key, wherein the recovery public key is associated with recovering the blockchain user account;

a first function for verifying the device authenticator FIDO2 public key and a second function for verifying the recovery public key; and, a set of logic functions that comprises first executing the first function and, if the first function fails, then executing the second function.

8. The data access server system of claim 7, wherein a recovery private key corresponds to the recovery public key, and the GUI displays the recovery private key.

9. The data access server system of claim 1, further storing thereon a second user account associated with a same user as the blockchain user account, and the second user account comprises a second user account address and a second credential; and wherein, in response to a command to rekey the blockchain user account, the at least one processor generates a rekeying mapping that the blockchain user account is associated with the second account address and the second credential.

10. The data access server system of claim 1, further storing thereon a second user account associated with a same user as the blockchain user account, and the second user account comprises a second user account address and a second credential; and, wherein the GUI displays the blockchain user account in association with at least one of the second account address and the second credential.

11. A method executable by a server system, the server system configured to communicate with at least a blockchain network of nodes and a user device, the method comprising:

providing a graphical user interface (GUI) configured to be displayed by the user device;

receiving an input via the GUI to create a credential that is associated with at least a device authenticator Fast Identity Online 2 (FIDO2) public key, a device ID of the user device and a web browser identifier of a web browser that is stored and operable on the user device, wherein a device authenticator FIDO2 private key corresponding to the device authenticator FIDO2 public key is stored on the user device;

receiving another input via the GUI to create a blockchain user account that comprises the credential, the blockchain user account operable to execute an action on the blockchain network of nodes;

automatically generating a code script for verifying the blockchain user account, the code script comprising the device authenticator FIDO2 public key;

automatically generating a user account address of the blockchain user account using the code script; and responsive to detecting a requested action to be made on the blockchain network of computer nodes using the user account address, executing the code script; and wherein the credential is used to cryptographically sign the requested action, which produces a FIDO2 digital signature associated with the requested action.

12. The method of claim 11, wherein a record of the requested action is verifiable on the blockchain network of computer nodes using the FIDO2 digital signature.

13. The method of claim 11, further comprising inputting the code script into a hash function to obtain a hash result, and wherein the hash result is the user account address.

14. The method of claim 11, wherein the server system comprises a database, and the method further comprising storing the credential in the database in association with the user account address.

15. The method of claim 11, further comprising adding a second credential to the blockchain user account, the second credential comprising a second device authenticator public key and at least one of the device ID or a second device ID; and the code script for verifying the blockchain user account comprises the second device authenticator public key.

16. The method of claim 15, wherein the code script comprises a first condition to verify the credential using the device authenticator public key and, if the first condition results in a failed verification of the credential, then executing a second condition to verify the second credential using the second device authenticator public key.

17. The method of claim 11, wherein the server system stores thereon a code script template that is used to generate the code script, the code script template comprising:

a first constant for the device authenticator FIDO2 public key and a second constant for a recovery public key, wherein the recovery public key is associated with recovering the blockchain user account;

a first function for verifying the device authenticator FIDO2 public key and a second function for verifying the recovery public key; and, a set of logic functions that comprises first executing the first function and, if the first function fails, then executing the second function.

18. The method of claim 17, wherein a recovery private key corresponds to the recovery public key, and the GUI displays the recovery private key.

19. The method of claim 11, further storing thereon a second user account associated with a same user as the blockchain user account, and the second user account comprises a second user account address and a second credential; and, wherein the GUI displays the blockchain user account in association with at least one of the second account address and the second credential.

20. A non-transitory computer readable medium storing computer executable instructions, which when executed by at least one processor on a server system, the server system configured to communicate with a blockchain network of nodes and a user device, cause the at least one processor to carry out a method, the method comprising:

providing a graphical user interface (GUI) configured to be displayed by the user device;

receiving an input via the GUI to create a credential that is associated with at least a device authenticator Fast Identity Online 2 (FIDO2) public key, a device ID of the user device and a web browser identifier of a web browser that is stored and operable on the user device, wherein a device authenticator FIDO2 private key corresponding to the device authenticator FIDO2 public key is stored on the user device;

receiving another input via the GUI to create a blockchain user account that comprises the credential, the blockchain user account operable to execute an action on the blockchain network of nodes;

automatically generating a code script for verifying the blockchain user account, the code script comprising the device authenticator FIDO2 public key;

automatically generating a user account address of the blockchain user account using the code script; and responsive to detecting a requested action to be made on the blockchain network of computer nodes using the user account address, executing the code script; and wherein the credential is used to cryptographically sign the requested action, which produces a FIDO2 digital signature associated with the requested action.

* * * * *